US 12,361,582 B2

(12) United States Patent
Ogura et al.

(10) Patent No.: US 12,361,582 B2
(45) Date of Patent: Jul. 15, 2025

(54) OBJECT DETECTION DEVICE AND MODEL PATTERN EVALUATION DEVICE

(71) Applicant: FANUC CORPORATION, Yamanashi (JP)

(72) Inventors: Shoutarou Ogura, Yamanashi (JP); Fumikazu Warashina, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 357 days.

(21) Appl. No.: 17/787,668

(22) PCT Filed: Jan. 5, 2021

(86) PCT No.: PCT/JP2021/000120
§ 371 (c)(1),
(2) Date: Jun. 21, 2022

(87) PCT Pub. No.: WO2021/141028
PCT Pub. Date: Jul. 15, 2021

(65) Prior Publication Data
US 2023/0024736 A1 Jan. 26, 2023

(30) Foreign Application Priority Data
Jan. 6, 2020 (JP) .................. 2020-000522

(51) Int. Cl.
*G06T 7/70* (2017.01)
*G06T 7/60* (2017.01)
(Continued)

(52) U.S. Cl.
CPC .............. *G06T 7/70* (2017.01); *G06T 7/60* (2013.01); *G06V 10/25* (2022.01); *G06V 10/44* (2022.01);
(Continued)

(58) Field of Classification Search
CPC ... G06T 7/70; G06T 7/60; G06T 2207/30108; G06T 2207/30164; G06T 7/75;
(Continued)

(56) References Cited

U.S. PATENT DOCUMENTS 9,978,138 B2 5/2018 Konishi
10,366,485 B2 7/2019 Nakao
(Continued)

FOREIGN PATENT DOCUMENTS

EP 1679657 B1 * 12/2017 ............... G06T 7/20
JP 2012048593 A 3/2012
(Continued)

OTHER PUBLICATIONS

EP-1679657-B1 (text document) (Year: 2017).*
(Continued)

*Primary Examiner* — Wassim Mahrouka
(74) *Attorney, Agent, or Firm* — Buchanan Ingersoll & Rooney PC

(57) ABSTRACT

A model pattern evaluation device for a robotic system comprises a processor. The processor is configured to: receive an image in which a target object is represented captured by a camera attached to a movable robotic component of the robotic system; calculate, for detecting the target object from the image, an evaluation value representing a geometric distribution of a plurality of features in a model pattern, the model pattern corresponding to the target object; set, among the plurality of features, a first feature for detecting a position in a specific direction of the target object in the image or a second feature for detecting an angle in a rotational direction centered about a predetermined point of the target object in the image as a feature of interest based
(Continued)

on the evaluation value; and generate a detection result based on the first or second features to control the movable robotic component.

6 Claims, 12 Drawing Sheets

(51) Int. Cl.
   *G06V 10/25* (2022.01)
   *G06V 10/44* (2022.01)
   *G06V 10/74* (2022.01)
(52) U.S. Cl.
   CPC ........ *G06V 10/761* (2022.01); *G06V 2201/07* (2022.01)
(58) Field of Classification Search
   CPC ...... G06V 10/25; G06V 10/44; G06V 10/761; G06V 2201/07; G01B 11/002; G01B 11/26
   See application file for complete search history.

(56) References Cited

U.S. PATENT DOCUMENTS

| | | | |
|---|---|---|---|
| 11,227,144 | B2 | 1/2022 | Namiki et al. |
| 2017/0132451 | A1* | 5/2017 | Namiki ................ G06V 10/757 |

FOREIGN PATENT DOCUMENTS

| | | |
|---|---|---|
| JP | 2015133049 A | 7/2015 |
| JP | 2016218729 A | 12/2016 |
| JP | 2017091079 A | 5/2017 |
| JP | 2017096749 A | 6/2017 |
| JP | 2017224009 A | 12/2017 |

OTHER PUBLICATIONS

International Search Report and Written Opinion for International Application No. PCT/JP2021/000120, dated Mar. 30, 2021, 9 pages.

* cited by examiner

OBJECT DETECTION DEVICE AND MODEL PATTERN EVALUATION DEVICE

CROSS REFERENCE TO RELATED APPLICATIONS

This is the U.S. National Phase application of PCT/JP2021/000120, filed Jan. 5, 2021, which claims priority to Japanese Patent Application No. 2020-000522, filed Jan. 6, 2020, the disclosures of these applications being incorporated herein by reference in their entireties for all purposes.

FIELD OF THE INVENTION

The present invention relates to, for example, an object detection device which detects an object represented in an image and a model pattern evaluation device which can evaluate a model pattern used to detect an object.

BACKGROUND OF THE INVENTION

Conventionally, technologies for detecting a region in which an object is represented from an image in which the object is represented have been proposed. Among such technologies, in particular, there has been proposed a technique for accurately determining the position of a target object having a shape with a high degree of shape symmetry, such as the wheel of an automobile, which causes the position and posture of the target object to be unable to be accurately determined without paying attention to a specific part thereof. For example, in the position determination method described in Patent Literature 1, in a standard image of a product serving as the standard of an object to be inspected, a first region surrounding a standard pattern and a second region characterizing the position and posture of the standard pattern are set. In this position determination method, features extracted from the first region are searched from the inspection target image, the position and posture of standard patterns in the image of the target to be inspected are roughly determined (first search process), and at least one of the roughly obtained position and posture is accurately determined by searching the features extracted from the second region from the image of the target to be inspected (second search step).

PATENT LITERATURE

[PTL 1] Japanese Unexamined Patent Publication (Kokai) No. 2017-96749

SUMMARY OF THE INVENTION

However, in the technology described in Reference 1, the second region is set by a console operation by a user. In the case of such a method, since the second region characterizing the position or posture is set by the subjective judgment of the user, a region which is not suitable for characterizing the position or posture may be set as the second region due to user error.

One aspect aims to provide an object detection device which can detect with high accuracy a symmetrical target object represented in an image.

According to an embodiment, there is provided an object detection device. This object detection device comprises a memory unit which stores a model pattern representing a plurality of predetermined features in different positions to each other on a target object when the target object is viewed from a predetermined direction, a feature extraction unit which extracts a plurality of the predetermined features from an image in which the target object is represented, and a collation unit which calculates a degree of coincidence representing a degree of matching between the plurality of the predetermined features of the model pattern and a plurality of the predetermined features extracted from a region corresponding to the model pattern in the image while changing at least one of a relative position or angle, or a relative direction and relative size of the model pattern with respect to the image, and which judges that the target object is represented in the region of the image corresponding to the model pattern when the degree of coincidence is equal to or greater than a predetermined threshold, wherein the predetermined features stored in the memory unit include a feature of interest which can be used for detecting a position in a specific direction of the target object in the image or which can be used for detecting an angle in a rotational direction centered about a predetermined point of the target object in the image, and the collation unit increases the contribution in the calculation of the degree of coincidence when the feature of interest of the model pattern and a predetermined feature in the image match as compared to the case in which a predetermined feature of the model pattern other than the feature of interest and the predetermined feature in the image match to calculate the degree of coincidence.

According to another embodiment, there is provided a model pattern evaluation device. This model pattern evaluation device comprises an evaluation unit which calculates, for a model pattern for detecting a target object from an image in which the target object is represented, an evaluation value representing a geometric distribution of a plurality of features included in the model pattern, and a feature of interest setting unit which sets, among the plurality of features, a first feature which can be used for detecting a position in a specific direction of the target object in the image or a second feature which can be used for detecting an angle in a rotational direction centered about a predetermined point of the target object in the image as a feature of interest based on the evaluation value.

According to an aspect, a symmetrical target object represented in an image can be detected with high accuracy.

DETAILED DESCRIPTION OF EMBODIMENTS OF THE INVENTION

Figure 1:
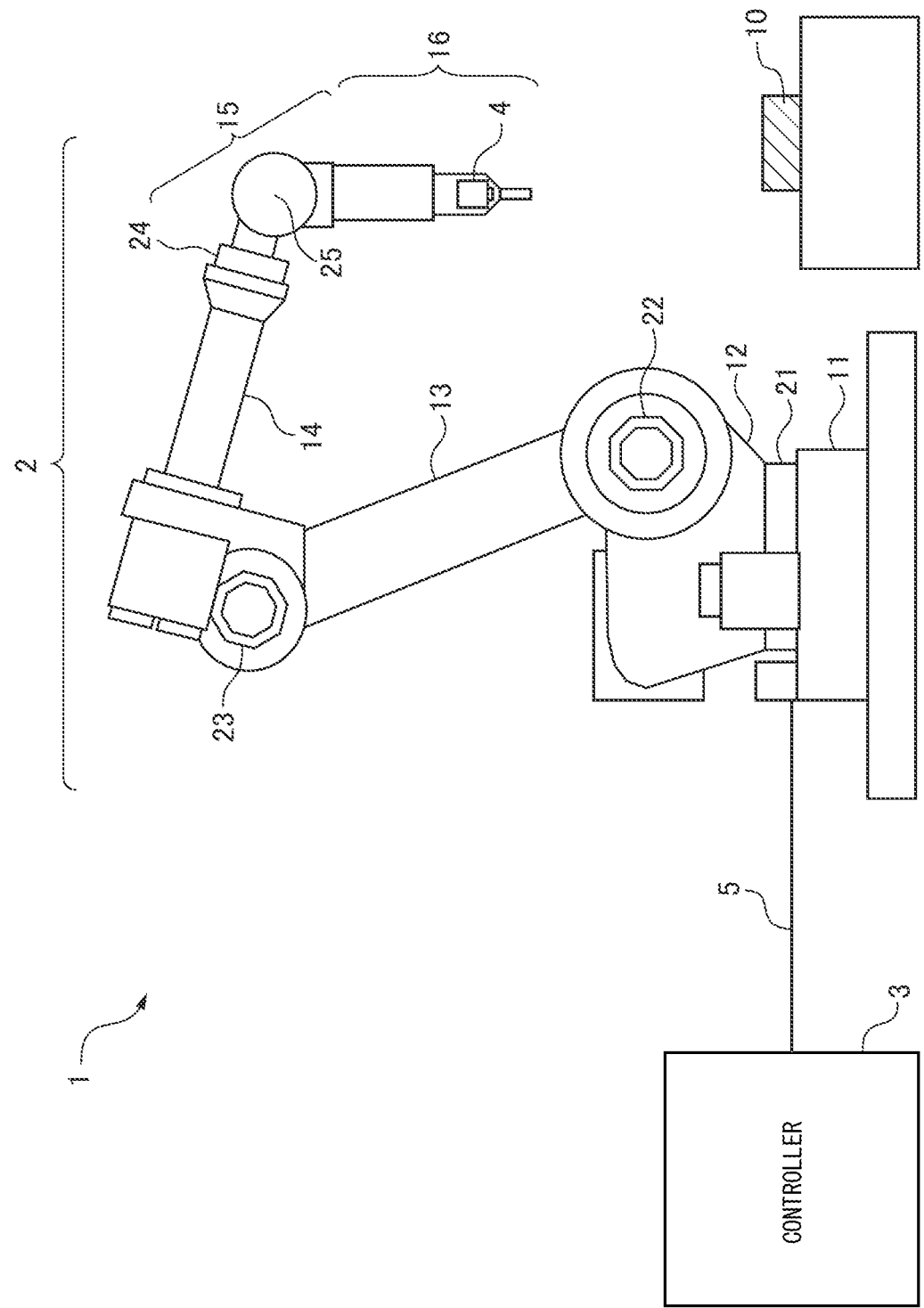
FIG. 1 is a schematic configuration view of a robot system according to an embodiment.

A model pattern evaluation device and object detection device according to embodiments of the present invention will be described below with reference to the drawings. The object detection device detects a target object from an image in which the target object is represented and which is obtained, for example, by an imaging unit capturing an object serving as a search target (hereinafter referred to simply as "target object"). At this time, the object detection device matches the image and a model pattern, which represents an appearance of the target object when viewed from a predetermined direction, while changing the relative positional relationship between the image and the model pattern, and calculates a degree of coincidence representing a degree of matching between a plurality of features set for the entirety of the model pattern and a plurality of features extracted from a comparison region in the image corresponding to the model pattern.

For example, a feature point cloud extracted from a model image including the target object to be detected is stored as a model pattern, and when the degree of coincidence of the feature point cloud extracted from the image acquired by the imaging unit and the feature point cloud of the model pattern exceeds a threshold value, it is judged that detection of the target object is successful.

When calculating the degree of coincidence between features of a model pattern and features in an image in which the target object is represented, depending on the shape of the target object to be detected by the model pattern, it may be difficult to match the position or angle (posture) of the model pattern with respect to the target object represented in the image. For example, when the shape of the target object is an elongated rectangle, or when the shape of the target object has symmetry such as rotational symmetry, it may be difficult to match the position or angle of the model pattern with the target object represented in the image. Note that in the following description, the ability to detect the position of the target object represented in the image is referred to as the position detection ability, and the ability to detect the angle of the target object represented in the image is referred to as the angle detection ability.

In the model pattern evaluation device of the present embodiment, an evaluation value representing the geometric distribution of a plurality of features included in the model pattern is calculated, and based on the evaluation value, the direction in which the distribution of the positions of the features is maximized is specified as the specific direction in which the position detection ability is low. Furthermore, in the model pattern evaluation device, based on the evaluation value, it is specified that the features are distributed in a rotational direction centered about a predetermined point, and the rotation direction is specified as the direction in which the angle detection ability is low. A feature of interest setting unit 37 extracts features which are distributed in a direction different from the specific directions or rotational direction, and sets them as features of interest on the model pattern. The object detection device accurately detects the position or angle of the target object from the image in which the target object is represented using the features of interest included in the model pattern.

An example in which the model pattern evaluation device and object detection device are incorporated in a robot system will be described below. In this example, an imaging unit attached to a movable part of a robot generates an image in which the target object is represented by capturing a workpiece which is the operation target of an automated machine as the target object. The robot controller in which the object detection device is incorporated then detects the target object from the image and controls the movable part based on the detection result.

FIG. 1 is a schematic configuration view of a robot system 1 according to an embodiment, in which a model pattern evaluation device and an object detection device are implemented. The robot system 1 comprises a robot 2, a controller 3 for controlling the robot 2, and a camera 4 which is attached to a movable part of the robot 2 and which is for capturing a workpiece 10, which is an example of a target object. The robot system 1 is an example of an automated machine.

The robot 2 comprises a pedestal 11, a rotating stage 12, a first arm 13, a second arm 14, a wrist 15, and a tool 16. The rotating stage 12, first arm 13, second arm 14, wrist 15, and tool 16 are examples of movable parts. The rotating stage 12, first arm 13, second arm 14, and wrist 15 are each supported by a shaft provided in a joint to which they are each attached, and a servo motor operates by driving such shaft. Furthermore, the workpiece 10 is conveyed by, for example, a belt conveyor, and while the workpiece 10 is positioned within a predetermined range, the robot 2 performs a predetermined operation on the workpiece 10.

The pedestal 11 is a member serving as a base when the robot 2 is installed on the floor. The rotating stage 12 is rotatably attached to the top surface of the pedestal 11 via a joint 21 with a shaft (not shown) provided so as to be orthogonal to one of the surfaces of the pedestal 11 as a center of rotation.

The first arm 13 is attached to the rotating stage 12 via a joint 22 provided in the rotating stage 12 on one end side thereof. In the present embodiment, as shown in FIG. 1, the first arm 13 can rotate at the joint 22 about a shaft (not shown) provided parallel to the surface of the pedestal 11 on which the rotating stage 12 is attached.

The second arm 14 is attached, on its one end side, to the first arm 13 via a joint 23 provided on the other end side of the first arm 13 on the side opposite the joint 22. In the present embodiment, as shown in FIG. 1, the second arm 14 is rotatable at the joint 23 about a shaft (not illustrated) provided parallel to the surface of the pedestal 11 on which the rotating stage 12 is mounted.

The wrist 15 is attached via the joint 24 at the tip of the second arm 14 on the side opposite the joint 23. The wrist 15 has a joint 25 and can bend around a shaft (not illustrated) provided parallel to the axis of the joint 22 and the axis of the joint 23 via a joint 25. Furthermore, the wrist 15 may be rotatable about a shaft (not illustrated) parallel to the longitudinal direction of the second arm 14 in a plane orthogonal to the longitudinal direction of the second arm 14.

The tool 16 is attached to the end of the wrist 15 on the side opposite the joint 24. The tool 16 has a mechanism or device for performing the operation on the workpiece 10. For example, the tool 16 may have a laser for machining the workpiece 10, or may have a servo gun for welding the workpiece 10. Alternatively, the tool 16 may have a hand mechanism for gripping the workpiece 10 or a component to be incorporated in the workpiece 10.

The camera 4 is an example of an imaging unit and is attached to, for example, the tool 16. Note that the camera 4 may be attached to another movable part such as the wrist 15 or the second arm 14. The camera 4 is oriented so as to include the workpiece 10 in an imaging range of the camera 4 when the robot 2 executes the operation on the workpiece 10. Further, the camera 4 generates an image representing the workpiece 10 by capturing an imaging range including the workpiece 10 at a predetermined shooting cycle. Each time the camera 4 generates an image, the generated image is output to the controller 3 via a communication line 5.

The controller 3 is connected to the robot 2 via the communication line 5, and receives information representing the operation condition of the servo motors which drive the shafts provided in each joint of the robot 2, the images from the camera 4, etc., from the robot 2 via the communication line 5. The controller 3 controls the position and posture of each movable part of the robot 2 by controlling the servo motors based on the received information and images, and the operation of the robot 2 received from the high-level controller (not illustrated) or set in advance.

Figure 2:
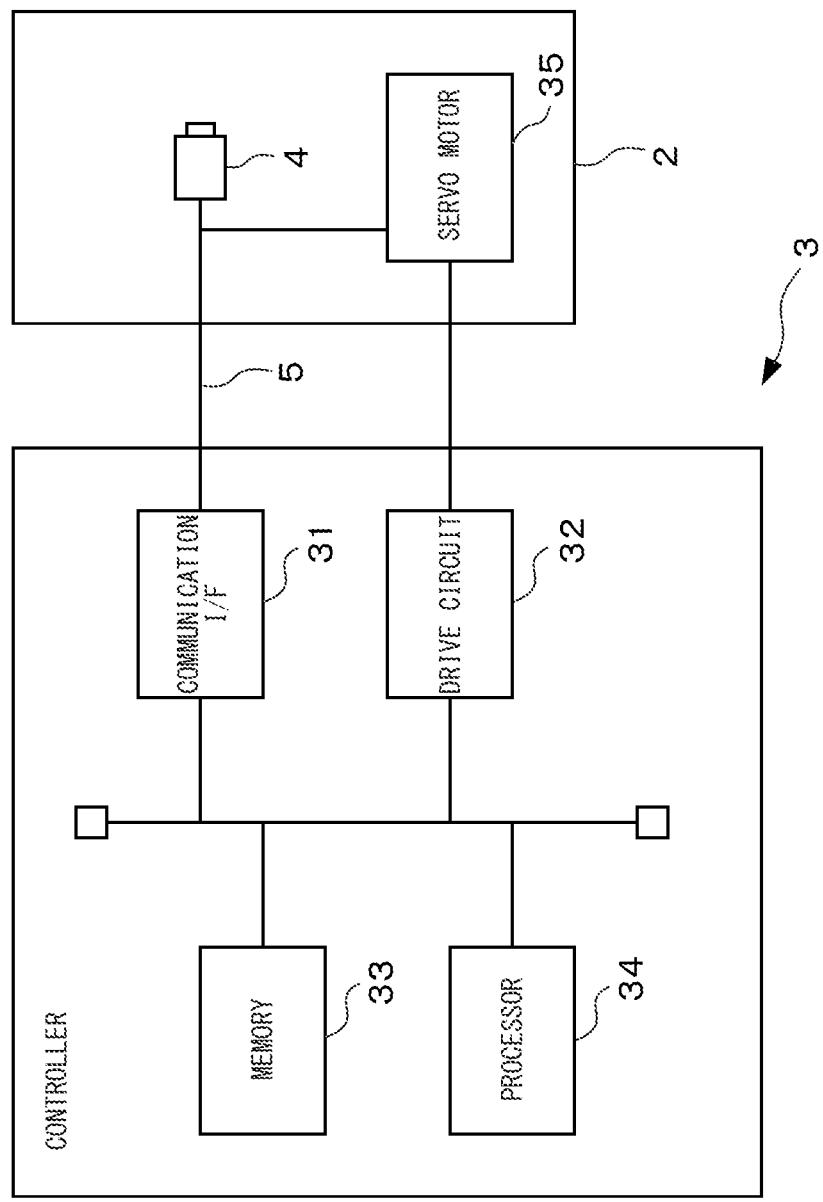
FIG. 2 is a schematic configuration view of a controller.

FIG. 2 is a schematic configuration view of the controller 3. The controller 3 comprises a communication interface 31, a drive circuit 32, a memory 33, and a processor 34. The controller 3 may further comprise a user interface (not illustrated) such as a touch panel.

The communication interface 31 includes, for example, a communication interface for connecting the controller 3 with the communication line 5 and circuitry or the like for executing processes related to the sending and receiving of signals via the communication line 5. The communication interface 31 receives, for example, information representing the operation condition of the servo motor 35, such as the measured value of the rotation amount from an encoder for detecting the rotation amount of the servo motor 35, which is an example of a drive unit, from the robot 2 via the communication line 5, and passes that information to the processor 34. Though one servo motor 35 is typically shown in FIG. 2, the robot 2 may have a servo motor for each joint for driving the shafts of the joints. Furthermore, the communication interface 31 receives an image from the camera 4 and passes it to the processor 34.

The drive circuit 32 is connected to the servo motor 35 via a current supply cable, and in accordance with the control by the processor 34, electric power corresponding to the torque, the rotation direction, or the rotation speed generated in the servo motor 35 is supplied to the servo motor 35.

The memory 33 is an example of a memory unit, and includes, for example, read/write semiconductor memory and read-only semiconductor memory. Further, the memory 33 may include a storage medium such as a semiconductor memory card, a hard disk, or an optical storage medium, and a device for accessing the storage medium.

The memory 33 stores various computer programs and the like for control of the robot 2 which are executed by the processor 34 of the controller 3. Furthermore, the memory 33 stores information for controlling the operations of the robot 2 when the robot 2 operates. Further, the memory 33 stores information indicating the operation condition of the servo motor 35 obtained from the robot 2 during operation of the robot 2. Additionally, the memory 33 stores various data used in the object detection process. Such data includes, for example, the model pattern of workpiece 10 used for detecting the workpiece 10, camera parameters representing information regarding the camera 4, such as the focal length, mounting position, and orientation, of the camera 4, and the images obtained from the camera 4.

In the present embodiment, the model pattern represents a plurality of predetermined features at different positions of the workpiece 10 when the workpiece 10 is viewed from a predetermined direction (for example, vertically above). Further, the workpiece 10 may have, for example, a symmetrical shape when viewed from the predetermined direction, for example, a shape having linear symmetry or rotational symmetry.

Figure 3A:
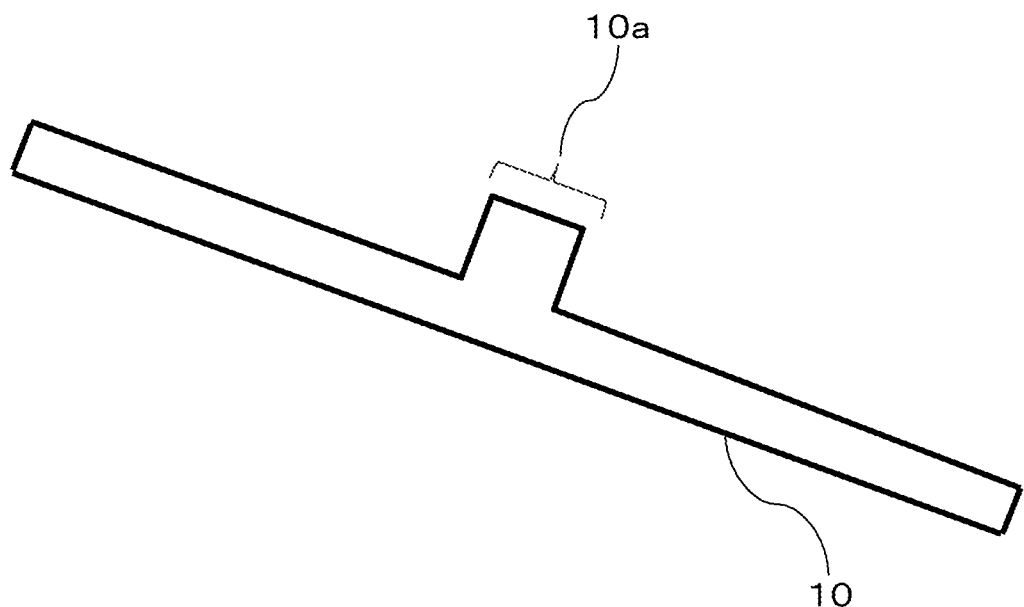
FIG. 3A is a view showing an example of a shape of a workpiece as viewed from a predetermined direction.
Figure 3B:
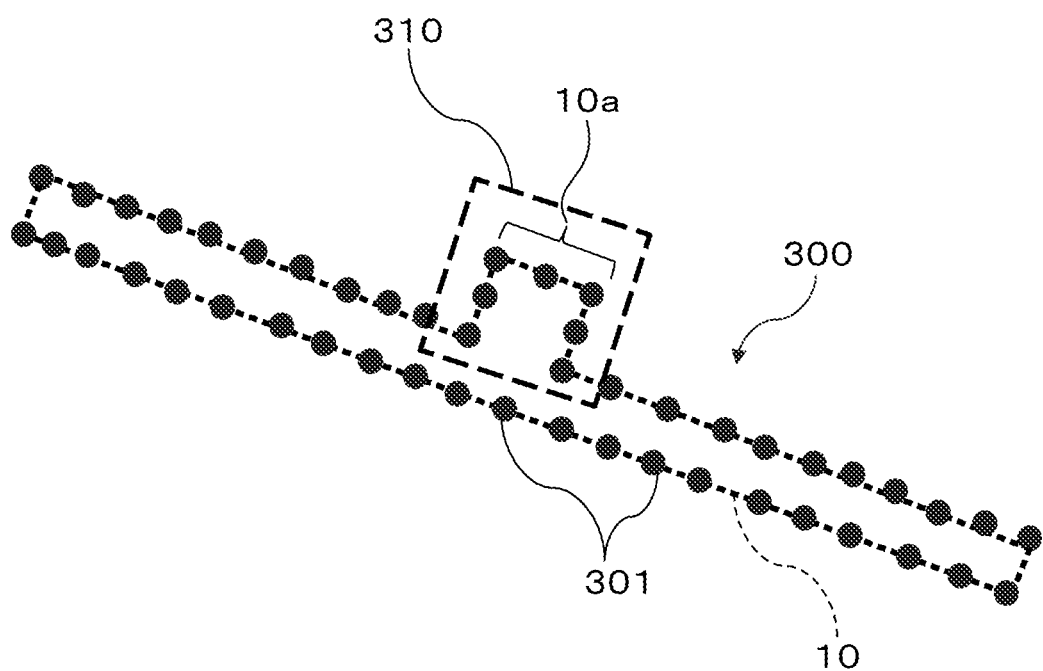
FIG. 3B is a view showing an example of a model pattern of a workpiece.

FIG. 3A is a view showing an example of the shape of the workpiece 10 as viewed from the predetermined direction, and FIG. 3B is a view showing an example of a model pattern of the workpiece 10. As shown in FIG. 3A, in this example, the workpiece 10 has an elongated rectangular contour when viewed from the predetermined direction, and has a shape in which a protrusion 10a is provided in the center in the longitudinal direction. Conversely, as shown in FIG. 3B, in the model pattern 300, a plurality of points 301 on the contour of the workpiece 10 are set as features.

The plurality of features 301 are acquired by performing the process of a feature extraction unit 38 of the processor 34, which is described later, on a reference image obtained by capturing the workpiece 10 from the predetermined direction. The model pattern 300 is represented by, for example, a binary image in which the pixel in which each feature 301 is positioned and the other pixels have different values. The image itself, such as the normalization correlation, may be used as the model pattern (template). In order to facilitate handling of the model pattern 300, it is preferable that the image coordinate system of the reference image be appropriately converted into the model pattern coordinate system in which only the region surrounding the model pattern 300 in the reference image is extracted.

The features 301 can be obtained by, for example, converting the three-dimensional data of the workpiece 10 into two-dimensional data, in addition to a method of acquiring from the image obtained by capturing the workpiece 10. In this case, for example, a three-dimensional local coordinate system in which the origin is placed on the imaging surface of the camera 4 is defined, and the target object expressed as CAD data is virtually arranged in this local coordinate system. A three-dimensional point cloud is then set at predetermined intervals on the contour line of the CAD data. At this time, if necessary, a contour line to be used as the model pattern 300 may be specified from the CAD data. The three-dimensional point cloud represented by the CAD data is then projected onto the image capture surface of the camera 4, and the two-dimensional point cloud in the image coordinate system is obtained. If the directions of light and dark are specified in the CAD data, the direction of the luminance gradient can also be added to the two-dimensional point cloud of the image coordinate system. The directions of light and dark are directions from the bright region to the dark region or from the dark region to the bright region using the contour line as a boundary. When the target object is captured to obtain the model pattern 300, the brightness information of the pixels includes the directions of light and dark. When projecting a three-dimensional point cloud represented by CAD data onto the capture surface of the camera 4, since the position of the two-dimensional point cloud in the image coordinate system includes the influence of aberrations of the camera 4, such as curvature of field, it is preferable to acquire the aberration characteristics of the camera 4 in advance and perform calibration according to the aberration characteristics so that these aberrations are reflected in the position of the two-dimensional point cloud.

The processor 34 is an example of a control unit, and comprises, for example, a Central Processing Unit (CPU) and peripheral circuits therefor. The processor 34 may further comprise a processor for numerical calculation. The processor 34 controls the entire robot system 1. The processor 34 executes a process for evaluating the model pattern and a moving part control process including an object detection process.

Figure 4:
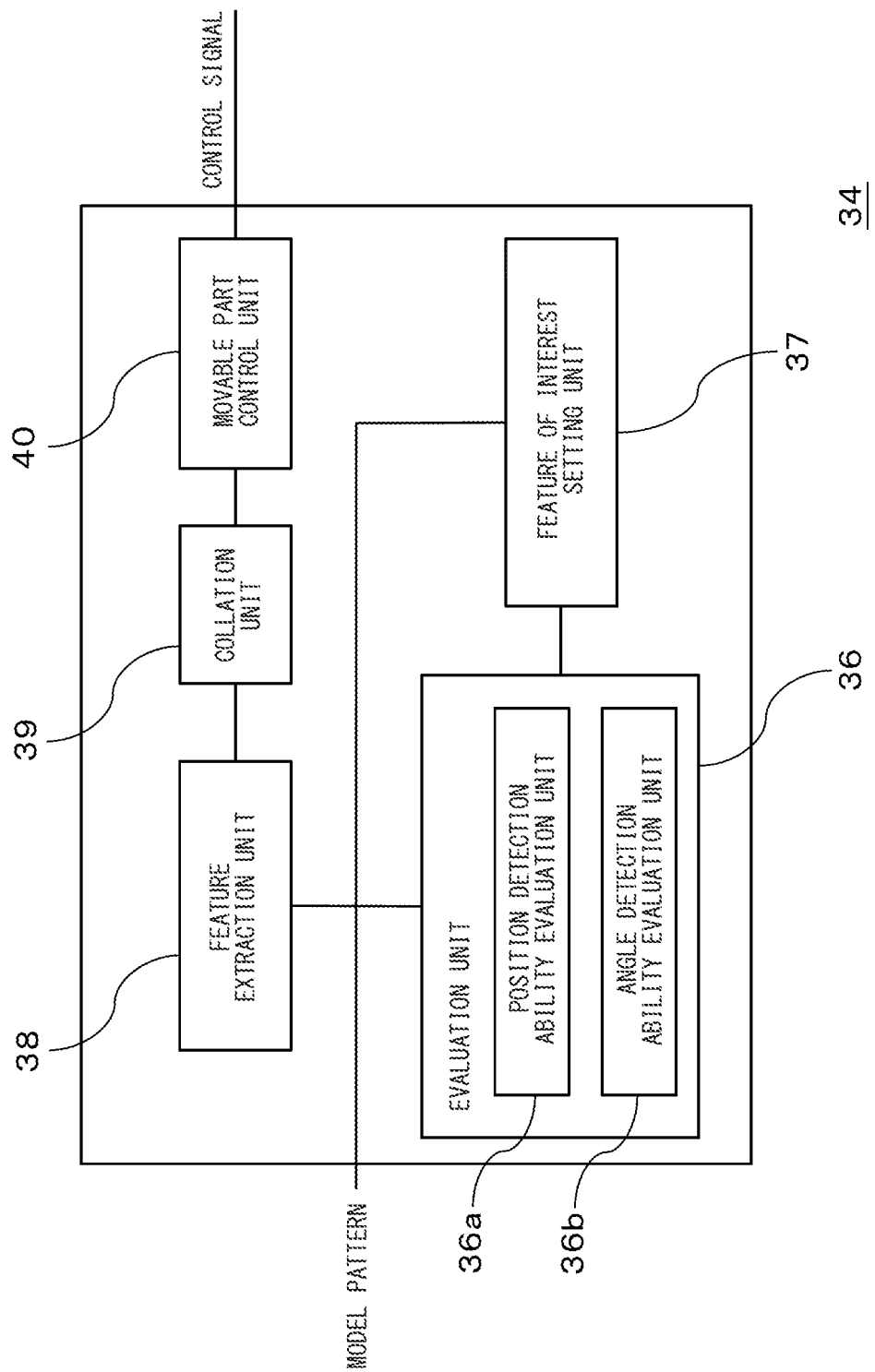
FIG. 4 is a functional block diagram of a processor included in a controller of a process for evaluating a model pattern and a movable part control process including an object detection process.

FIG. 4 is a functional block diagram of the processor 34 in relation to the process for evaluating the model pattern and the moving part control process including the object detection process. The processor 34 comprises an evaluation unit 36, a feature of interest setting unit 37, a feature extraction unit 38, a collation unit 39, and a movable part control unit 40.

These various units included in the processor 34 are, for example, function modules realized by computer programs executed by the processor 34. Alternatively, these units may be realized as dedicated arithmetic circuits mounted in a part of the processor 34.

Among these units included in the processor 34, the processes by the evaluation unit 36 and the feature of interest setting unit 37 correspond to the model pattern evaluation process, and the processes by the feature extraction unit 38 and the collation unit 39 correspond to the object detection process. In the explanation below, first, the model pattern evaluation process by the evaluation unit 36 and the feature of interest setting unit 37 will be described, and thereafter, the object detection process by the feature extraction unit 38 and the collation unit 39 will be described.

When calculating the degree of coincidence between the features of the model pattern and the features in the target image, if special attention is not paid to some features of the model pattern, in some cases, the position or angle of the model pattern for the target object represented in the target image cannot be specified correctly.

For example, in the shapes shown in FIGS. 3A and 3B, the protrusion 10a is present in the contour of the workpiece 10. In the case of the shapes shown in FIGS. 3A and 3B, when feature matching is performed between the model pattern 300 and the target image, even if the model pattern and the target image do not match in the region 310 surrounded by the dotted line in FIG. 3B, the degree of coincidence may be highly recognized as the pattern as a whole. In such a case, the position or angle (posture) of the model pattern for the target image may be detected incorrectly.

Thus, in the present embodiment, the evaluation unit 36 calculates an evaluation value representing the geometric distribution of the plurality of features included in the model pattern, and based on the evaluation value, specifies the direction in which the distribution of the positions of the features is maximized as the specific direction in which the position detection ability is low. Furthermore, the evaluation unit 36 specifies that at least some of the plurality of features are distributed along the rotation direction centered about the predetermined point based on the evaluation value, and defines this rotation direction as the direction in which the angle detection ability is low. The feature of interest setting unit 37 sets the features distributed in the direction different from these specific directions or rotation directions as features of interest. As a result, the model pattern represents the features of workpiece 10 and represents the features of interest with high position detection ability or angle detection ability.

Specifically, in the algorithm described below, the evaluation unit 36 geometrically evaluates the position detection ability or angle detection ability of the features represented in the model pattern. The feature of interest setting unit 37 extracts features having a high position detection ability or angle detection ability, and sets them as features of interest for the model pattern. Position detection ability is evaluated by a position detection ability evaluation unit 36a of the evaluation unit 36, and angle detection ability is evaluated by an angle detection ability evaluation unit 36b of the evaluation unit 36. Though the evaluation unit 36 evaluates the position detection ability and the angle detection ability in parallel, only one of position detection ability and angle detection ability may be evaluated.

First, the process which is performed by the position detection ability evaluation unit 36a will be described. Note that below, the case in which each feature is a point on an outline of the model pattern, i.e., the case in which each feature is a feature point, will be described as an example.

Referring to FIG. 3A, the workpiece 10 has a simple rectangular shape aside from the protrusion 10a, and the shape does not substantially change in the direction along the longitudinal direction of the rectangle. Thus, in the image in which the workpiece 10 is represented, it is difficult to detect the position of the workpiece 10 in the longitudinal direction. Therefore, in the model pattern 300 shown in FIG. 3B, the position detection ability evaluation unit 36a sets features distributed in a direction different from the longitudinal direction as the features of interest in the model pattern 300.

The position detection ability evaluation unit 36a calculates the position detection ability of the model pattern 300 from the distribution of the angles of the edges of the contour of the model pattern 300. The position detection ability evaluation unit 36a then judges that the position detection ability of the model pattern 300 is high if the distribution of these angles is approximately the same in the two orthogonal directions, and if the distribution of the edge angles is biased in one direction, it judges that the position detection ability of the model pattern 300 is low.

Figure 5:
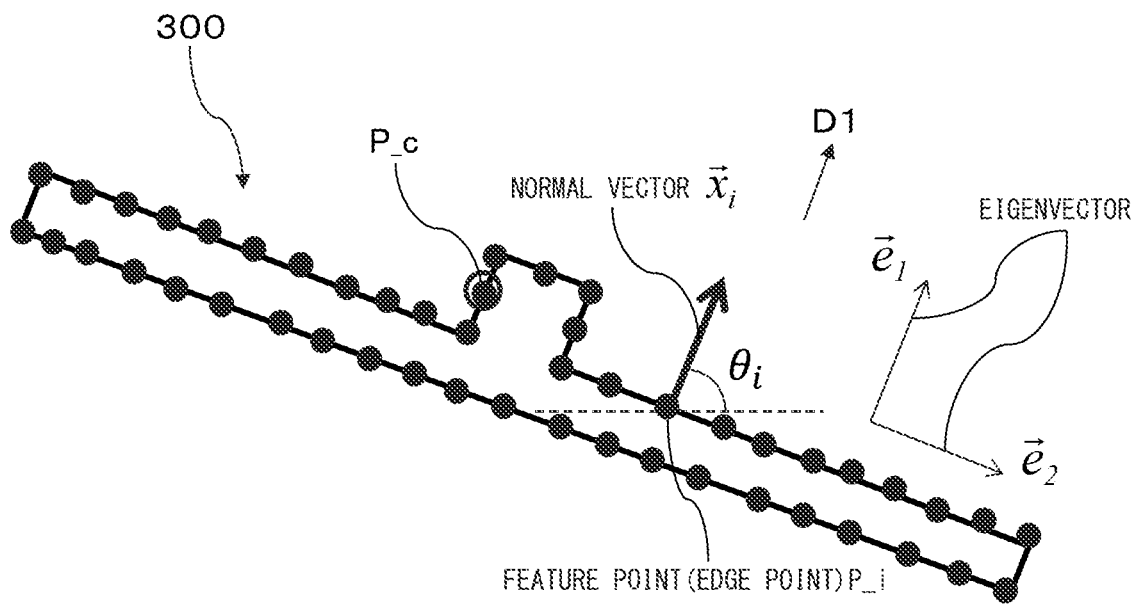
FIG. 5 is a schematic view showing a method for evaluating a position detection ability of the model pattern shown in FIG. 3B.

FIG. 5 is a schematic view showing a method for evaluating the position detection ability of the model pattern 300 of FIG. 3B. The position detection ability evaluation unit 36a calculates a covariance matrix Q representing the distribution of the angle $\theta_i$ of the normal vector which passes through each feature point P_i set in the model pattern 300 and which is orthogonal to the direction in which the adjacent feature points are aligned (the direction of the contour line of the model pattern 300). The two eigenvalues of the covariance matrix Q and the eigenvectors corresponding to each of these eigenvalues are then calculated. Though various feature points can be used, in the present embodiment, the edge points on the contour of the model pattern 300 obtained by edge detection are used as the feature points. An edge point is, for example, a point on the contour of a target object obtained as a point having a large luminance gradient in the image and obtained based on the luminance gradient. A well-known method is adopted as the method for detecting the edge points. Though normal vectors are used here, tangent vectors may be used.

Specifically, as shown in FIG. 5, the normal vector at each of the N feature points P_i is defined as follows.

$$\vec{x}_1, \vec{x}_2, \ldots, \vec{x}_M \qquad \text{[Math 1]}$$

When the angle of each normal vector is defined $\theta_i$, the normal vector at the feature point P_i is expressed as follows:

$$\vec{x}_i(\cos\theta_i, \sin\theta_i) \qquad \text{[Math 2]}$$

The angle θi (edge angle) of the normal vector itself is periodic and difficult to handle as an evaluation target. Thus, as the data input to the evaluation unit 36 as the evaluation target, the normal vector ($\cos\theta_i$, $\sin\theta_i$) is used as described above, instead of directly using the angle $\theta_i$. Furthermore, in order to ensure that input data having different 180° orientations are evaluated in the same manner, and to prevent the center of gravity of the model pattern 300 from shifting and making it difficult to evaluate the size of the eigenvalues, it is preferable that two vectors (cosθ, sinθ) and (−cosθ, −sinθ) for one feature point be input to the evaluation unit 36 as evaluation targets.

Furthermore, the average of N normal vectors is expressed by formula (1) below.

[Math 3]

$$\vec{c} = \frac{1}{N}\sum_{i=1}^{N}\vec{x}_i \qquad (1)$$

Further, the covariance matrix Q of the normal vector is expressed by formula (2) below.

[Math 4]

$$Q = \frac{1}{N}\sum_{i=1}^{N}(\vec{x}_i - \vec{c})(\vec{x}_i - \vec{c})^T \qquad (2)$$

When the eigenvalue of the covariance matrix Q is defined as $\lambda_j$ and the eigenvector is defined as $e_j$, formula (3) below holds.

[Math 5]

$$Q\vec{e}_j = \lambda_j \vec{e}_j \qquad (3)$$

Considering a set of one-dimensional data as the input data of the evaluation target, the covariance matrix Q corresponds to the variance of the input data. Considering the model pattern 300 as a set of two-dimensional coordinate values (x, y), the eigenvector $e_i$ and the eigenvalue $\lambda_i$ of the covariance matrix Q of the normal vector correspond to the variance of the distribution of the normal vector, and indicate the spreading direction and the spreading magnitude (variance) of the distribution of the normal vector. In the present embodiment, since the covariance matrix Q is obtained from two-dimensional values, the number of eigenvectors and the number of eigenvalues are each two. The larger eigenvalue and the eigenvector corresponding to the larger eigenvalue indicate the magnitude of the spread of the distribution of the normal vector and the direction in which the spread of the distribution is maximum, respectively. The smaller eigenvalue and the eigenvector corresponding to the smaller eigenvalue indicate the magnitude of the spread of the distribution in the direction orthogonal to the eigenvector corresponding to the larger eigenvalue and the direction thereof, respectively. The direction in which the spread of the distribution of the position of the features is maximized is the direction of the eigenvector corresponding to the larger eigenvalue.

Thus, the magnitudes of the two eigenvalues are similar, and the closer the ratio of the two eigenvalues is to 1, the more stably the normal vector of the feature points constituting the model pattern 300 will be distributed in each direction of the two orthogonal eigenvectors, whereby the position detection ability of the model pattern 300 becomes high.

Conversely, when the magnitudes of the two eigenvalues are biased and the ratio of the smaller eigenvalue to the larger eigenvalue is close to 0, the normal vector of the feature points constituting the model pattern 300 is distributed in a biased manner toward the direction of the eigenvector corresponding to the smaller eigenvalue. In this case, position alignment becomes difficult with respect to the direction of the eigenvector corresponding to the larger eigenvalue, i.e., the direction in which the distribution spread of the feature position is maximized, whereby the position detection ability of the model pattern 300 becomes low. As described above, by calculating the ratio between the principal component of the normal vector and the direction orthogonal to the principal component by principal component analysis using the value of the normal vector, the position detection ability of the model pattern 300 is calculated.

Thus, the ratio obtained by dividing the smaller eigenvalue ($\min(\lambda_1, \lambda_2)$) by the larger eigenvalue ($\max(\lambda_1, \lambda_2)$) is defined as evaluation value $A_1$ of the position detection ability of model pattern 300, and the evaluation value $A_1$ is defined by formula (4) below.

$$A_1 = \min(\lambda_1, \lambda_2)/\max(\lambda_1, \lambda_2) \qquad (4)$$

The evaluation value $A_1$ ranges between 0 to 1.0, and the closer the evaluation value $\lambda_1$ is to 1, the more stable the distribution of the angle $\theta_i$ of the normal vector and the less the bias of the angle $\theta_i$, whereby the position detection ability of the model pattern 300 becomes high. For example, when the model pattern 300 is a perfect circle, the value of the evaluation value $A_1$ is 1, and the position detection ability is highest. Furthermore, when the model pattern 300 is an ellipse, the direction of the long axis of the ellipse is the direction of the eigenvector corresponding to the larger eigenvalue of the covariance matrix Q of the normal vector, and the direction of the minor axis is the direction of the eigenvector corresponding to the smaller eigenvalue. The longer the major axis is with respect to the minor axis, the lower the position detection ability of the model pattern 300 in the direction of the major axis, since the distribution of the normal vector is biased toward the minor axis. When the model pattern 300 is a straight line, the value of the evaluation value $A_1$ is 0, and the position detection ability is the lowest. Thus, the evaluation value $A_1$ represents the geometric distribution of a plurality of features included in the model pattern. The covariance matrix Q, eigenvalues, and eigenvectors are also evaluation values representing the geometric distribution of the plurality of features included in the model pattern.

The position detection ability evaluation unit 36a compares the evaluation value $A_1$ with a preset threshold value, and when the evaluation value $A_1$ is smaller than the preset threshold value, it is judged that the position detection ability of the model pattern 300 is low, i.e., the model pattern 300 does not have position detection ability. The position detection ability evaluation unit 36a then judges the direction of the eigenvector corresponding to the larger eigenvalue as the direction having no position detection ability.

In the example shown in FIG. 5, since the normal vector of most feature points P_i is in the direction of arrow $D_1$ shown in FIG. 5, the distribution spread of the normal vector is the smallest in the direction of arrow $D_1$. Conversely, the distribution of the normal vector becomes the largest in the direction orthogonal to the arrow $D_1$ direction. Thus, the direction of the eigenvector corresponding to the smaller eigenvalue among the two eigenvectors is approximately the $D_1$ direction. Furthermore, the direction of the eigenvector corresponding to the larger eigenvalue of the two eigenvectors is a direction substantially orthogonal to the $D_1$ direction. Since the eigenvalue of the eigenvector in the direction orthogonal to the arrow $D_1$ direction is larger, the position detection ability evaluation unit 36a judges that the position detection ability in the direction orthogonal to the arrow $D_1$ direction is low.

Figure 6:
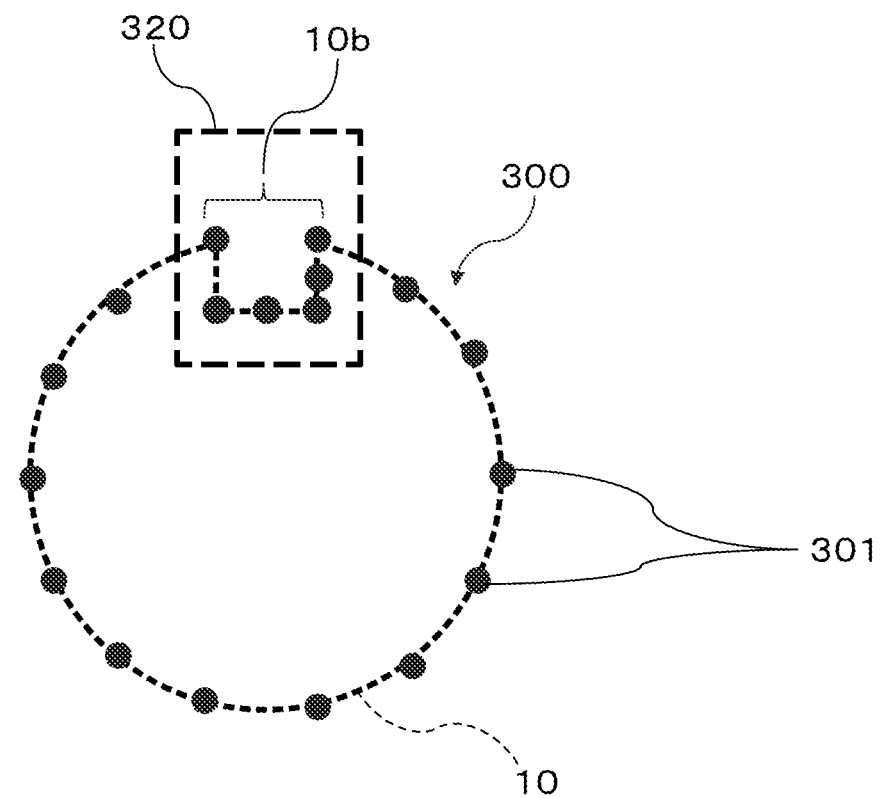
FIG. 6 is a schematic view showing another example of a model pattern.

Next, the process performed by the angle detection ability evaluation unit 36b will be described. FIG. 6 is a schematic view showing another example of the model pattern 300. There is exemplified a model pattern 300 corresponding to the workpiece 10 having a linear symmetrical shape in which the contour is substantially circular when viewed from the predetermined direction and a part of the contour lacks a concave shape.

This workpiece 10 corresponds to, for example, a round bar having an end face provided with a key groove 10b when viewed from the axial direction. The workpiece 10 has a simple circular shape other than a key groove 10b, and the shape does not substantially change in the rotation direction with the center of the circle as the center of rotation. Thus, in the image in which the workpiece 10 is represented, it is difficult to detect the angle of the workpiece 10 in the rotation direction. Therefore, in the model pattern 300 shown in FIG. 6, the angle detection ability evaluation unit 36b sets the features distributed in a direction different from the rotation direction as the features of interest of the model pattern 300.

Figure 7:
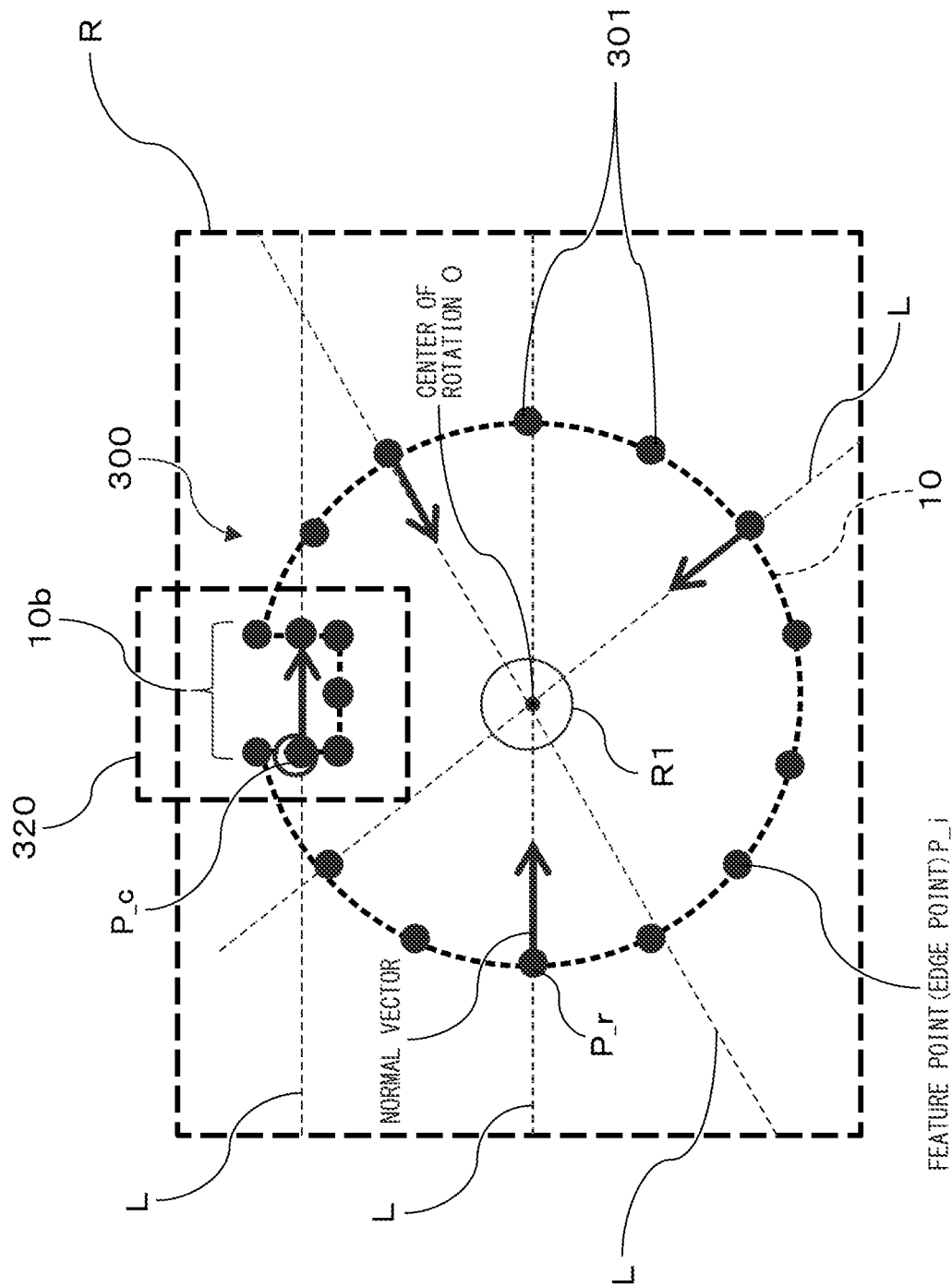
FIG. 7 is a schematic view showing a method for evaluating an angle detection ability of the model pattern shown in FIG. 6.

FIG. 7 is a schematic view showing the angle detection ability evaluation method of the model pattern 300 shown in FIG. 6. The angle detection ability of the model pattern 300 shown in FIG. 6 is evaluated by setting the rectangular region R shown in FIG. 7 and using the normal of the feature points in the rectangular region R.

The angle detection ability evaluation unit 36b first acquires a normal vector which passes through each feature point P_i constituting the model pattern 300 and which is orthogonal to the direction in which adjacent feature points are aligned (the direction of the contour line of the model pattern 300), and sets the normal L extending in the direction of the normal vector. Note that in FIG. 7, though the normal vector (indicated by the arrow in FIG. 7) and the normal L are shown only for some feature points, a normal vector and a normal L are set for all feature points in the rectangular region R.

In the angle detection ability evaluation unit 36b, the point where the most lines intersect in the rectangular region R is set as the center of rotation O. When the normals of many feature points intersect at the center of rotation O, these feature points are points on the circumference centered on the center of rotation O, and are feature points having a low angle detection ability in the direction of rotation centered on the center of rotation O. Conversely, feature points where the normal L does not pass through the center of rotation O are not points on the circumference centered on the center of rotation O, and are feature points having a high angle detection ability in the rotation direction centered on the center of rotation O. In the example of FIG. 7, the feature point P_c on the contour line corresponding to the key groove 10b is a feature point having a high angle detection ability because the normal L does not pass through the center of rotation O. Conversely, the feature point P_r on the circumference corresponding to the outer peripheral surface of the workpiece 10 is a feature point having a low angle detection ability because the normal L passes through the center of rotation O.

Thus, whether or not the angle detection ability of the model pattern 300 is low can be judged from the number of feature points where the normal L passes through the center of rotation O, such as the feature point P_r. The larger the number of feature points for which the normal L passes through the center of rotation O, the closer the contour shape of model pattern 300 (the shape in which feature points are distributed) becomes to a circle, and the lower the angle detection ability of the model pattern 300. Thus, the angle detection ability evaluation unit 36b acquires the ratio of the number of normals L intersecting the center of rotation O to the total number of feature points. The angle detection ability evaluation unit 36b judges that the angle detection ability of the model pattern 300 is low, i.e., that the model pattern 300 does not have angle detection ability, when this ratio is set as evaluation value $A_2$ and the evaluation value $A_2$ is a value greater than the preset threshold value.

Note that as shown in FIG. 7, when the outline of the model pattern 300 includes a perfect circle, though a plurality of normals L theoretically intersect at one point, considering that errors are included in the positions of the feature points, the normals L may not intersect at one point. Furthermore, even when the contour of the model pattern 300 is not a perfect circle or the contour has subtle irregularities, the normals L may not intersect at one point. Thus, the angle detection ability evaluation unit 36b clusters a plurality of intersections present in the rectangular region R, for example, according to the degree of density, determines the center of gravity of the class in which the most intersections are gathered, and may define a region R1 at a predetermined distance from this center of gravity as the center of rotation.

The evaluation value $A_2$ ranges between 0 to 1.0, and the closer the evaluation value $A_2$ is to 0, the lower the ratio of the number of normal L intersecting at the center of rotation O to all the feature points, and since the feature points are not distributed on the circumference, the model pattern 300 is not a rotationally symmetric shape, whereby the angle detection ability of the model pattern 300 is high. Furthermore, the closer the evaluation value $A_2$ is to 1, the higher the ratio of the number of normal L intersecting at the center of rotation O to all the feature points, and the feature points are distributed on the circumference, whereby the angle detection ability of the model pattern 300 becomes lower. For example, when the normal L of all feature points of model pattern 300 intersect at one point, the evaluation value is 1. In this case, the model pattern 300 is a perfect circle, and the angle detection ability of the model pattern 300 is the lowest. Thus, the evaluation value $A_2$ represents the geometric distribution of a plurality of features included in the model pattern.

As described above, the angle detection ability evaluation unit 36b evaluates the geometric distribution of the features of the model pattern 300 based on the evaluation value $A_2$, and when the evaluation value $A_2$ is greater than the threshold value, it can be specified that at least some of the plurality of features are distributed along the rotation direction centered on the center of rotation O.

As described above, the position detection ability and angle detection ability of the model pattern 300 are evaluated, and when it is judged that the position detection ability and angle detection ability of the model pattern 300 are low based on the evaluation values $A_1$ and $A_2$, the feature of interest setting unit 37 sets features which are distributed in a direction different from the direction in which the position detection ability or the angle detection ability is low as the features of interest. More specifically, the feature of interest setting unit 37 sets a feature on the contour of the model pattern 300 in a direction different from the direction in which the position detection ability or the angle detection ability is low as the feature of interest.

In the example of FIG. 5, for example, the feature point P_c on the contour line of the model pattern 300 corresponding to the protrusion 10a is set as the feature of interest. Preferably, the feature on the contour of the model pattern 300 in the direction orthogonal to the direction in which the position detection ability is low is set as the feature of interest. Furthermore, a feature on the contour of the model pattern 300 in a direction within a predetermined angle range with respect to the direction orthogonal to the direction in which the position detection ability is low may be set as the feature of interest. For example, a feature on the contour of the model pattern 300 in the direction within ±30° with respect to the direction orthogonal to the direction in which the position detection ability is low may be set as the feature of interest.

Furthermore, in the example of FIG. 7, for example, the feature point P_c on the contour line of the model pattern 300 corresponding to the key groove 10b is set as the feature of interest. Preferably, a feature on the contour of the model pattern 300 in a direction orthogonal to the direction in which the angle detection ability is low is set as the feature of interest. Furthermore, a feature on the contour of the model pattern 300 in a direction within a predetermined angle range with respect to the direction orthogonal to the direction in which the angle detection ability is low may be set as the feature of interest. For example, a feature on the contour of the model pattern 300 in the direction within ±30° with respect to the direction orthogonal to the direction in which the angle detection ability is low may be set as the feature of interest. Furthermore, the feature point P_i for which the normal L does not pass through the center of rotation O may be set as the feature of interest.

Regarding the feature of interest, the feature point itself may be set as the feature of interest, in the manner of the feature points P_c shown in FIGS. 5 and 7, or a region which is a set of feature points may be set as the features of interest. For example, the feature of interest setting unit 37 extracts a plurality of feature points which are distributed in a direction different from the direction in which the position detection ability or the angle detection ability is low, and a region on a model pattern containing this plurality of feature points may be set as the feature of interest. Furthermore, the feature of interest setting unit 37 may set a feature of interest which is a set of a plurality of features points by extracting a plurality of feature points which are distributed in a direction different from the direction in which the position detection ability or the angle detection ability is low, calculating the center of gravity from the positions of the extracted plurality of feature points, and clustering the feature points located within a predetermined range from the center of gravity.

As described above, the feature of interest is set in the model pattern as a feature having position detection ability or angle detection ability. The model pattern in which the feature of interest is set is stored in the memory 33.

As described above, by geometrically evaluating the model pattern and judging the direction in which it is difficult to detect the position or angle for the target object represented by the target image, a feature of interest with which position and angle can stably be detected is set. This eliminates the need for a human to visually judge the model pattern to determine the direction of low position detection ability or angle detection ability, whereby the selection of features which should not be selected as features of interest on the model pattern due to human carelessness can be suppressed. In particular, when the model pattern becomes complicated, it becomes difficult for a human to visually judge a remarkable feature. According to the present embodiment, the model pattern evaluation device evaluates the geometric distribution of a plurality of features included in the model pattern, and thus, even if the model pattern has a complicated shape, a feature of interest with which the position and angle of the target object represented by the target image can be stably detected is reliably set.

Figure 8:
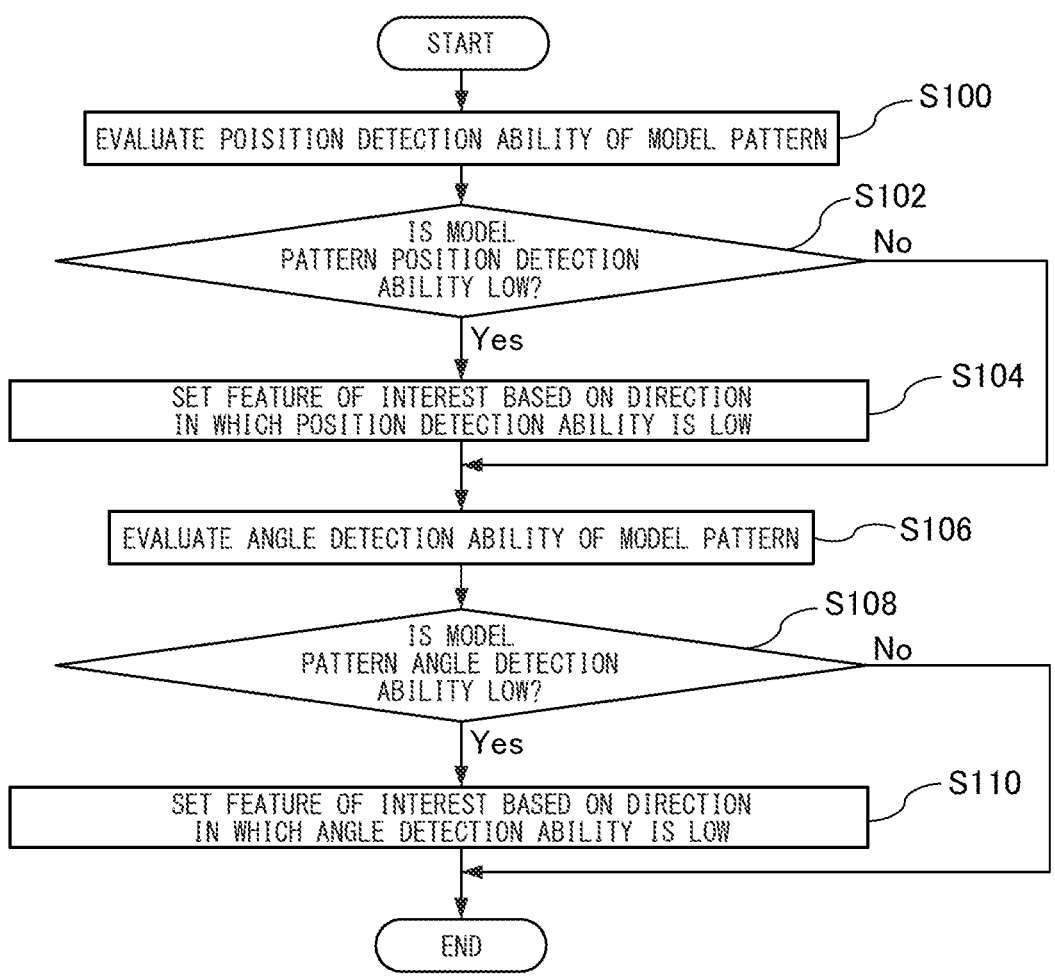
FIG. 8 is a flowchart showing the overall flow of a process for evaluating position detection ability and angle detection ability and a process for setting a feature of interest based on the evaluation.

Next, the processes performed by the evaluation unit 36 and feature of interest setting unit 37 of the processor 34 of the controller 3 will be described based on FIGS. 8 to 10. FIG. 8 is a flowchart showing the entire flows of the process for evaluating the position detection ability and angle detection ability and the process for setting the feature of interest based on the evaluation.

First, the position detection ability evaluation unit 36a evaluates the position detection ability of the model pattern (step S100) and judges whether or not the position detection ability of the model pattern is low (step S102). As described above, the position detection ability evaluation unit 36a compares the evaluation value $A_1$ with the preset threshold value, and when the evaluation value $A_1$ is less than the preset threshold value, it is judged that the position detection ability of the model pattern is low. When the position detection ability of the model pattern is low, the feature of interest setting unit 37 sets a feature which is distributed in a direction different from the direction in which the position detection ability is low as the feature of interest, based on the direction in which the position detection ability is low (step S104). Note that when the position detection ability of the model pattern is high, the process proceeds to step S106 without performing the process of step S104.

Next, the angle detection ability evaluation unit 36b evaluates the angle detection ability of the model pattern (step S106) and judges whether or not the angle detection ability of the model pattern is low (step S108). As described above, the angle detection ability evaluation unit 36b compares the evaluation value $A_2$ with the preset threshold value, and when the evaluation value $A_2$ is greater than the preset threshold value, it is judged that the angle detection ability of the model pattern is low. When the angle detection ability of the model pattern is low, the feature of interest setting unit 37 sets a feature which is distributed in a direction different from the direction in which the angle detection ability is low as the feature of interest, based on the direction in which the angle detection ability is low (step S110). After step S110, the process ends. Note that when the angle detection ability of the model pattern is high, the process ends without performing the process of step S108.

Figure 9:
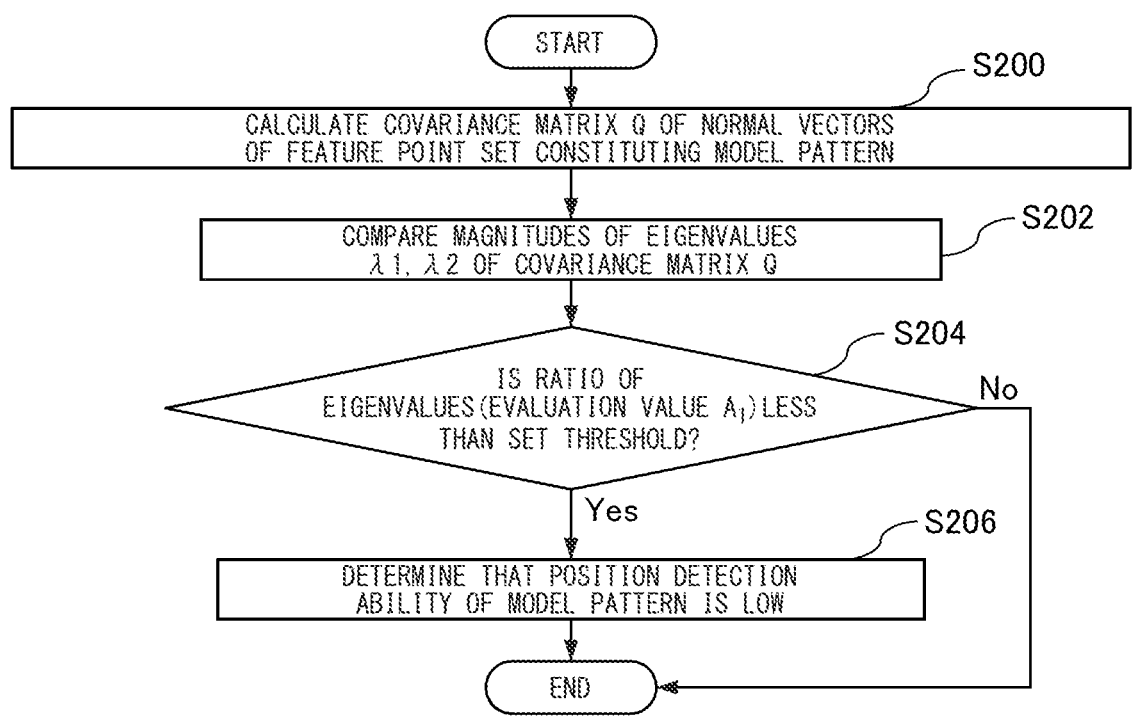
FIG. 9 is a flowchart showing a process in which a position detection ability evaluation unit evaluates position detection ability of a model pattern.

FIG. 9 is a flowchart showing the process (step S100 in FIG. 8) in which the position detection ability evaluation unit 36*a* evaluates the position detection ability of the model pattern. First, the covariance matrix Q of the normal vector of the feature point cloud constituting the model pattern is calculated (step S200). Next, the magnitudes of the two eigenvalues $\lambda_1$, $\lambda_2$ of the covariance matrix Q are compared (step S202). Next, it is judged whether or not the evaluation value A1 (min ($\lambda_1$, $\lambda_2$)/max ($\lambda_1$, $\lambda_2$)), which is the ratio of the eigenvalues $\lambda_1$, $\lambda_2$, is less than the set threshold value (step S204), and when the evaluation value $A_1$ is less than the threshold value, it is judged that the position detection ability of the model pattern is low (step S206). After step S206, the process ends. Note that when the evaluation value $A_1$ is equal to or greater than the threshold value in step S204, the position detection ability of the model pattern is high, and the process ends without performing the process of step S206.

Figure 10:
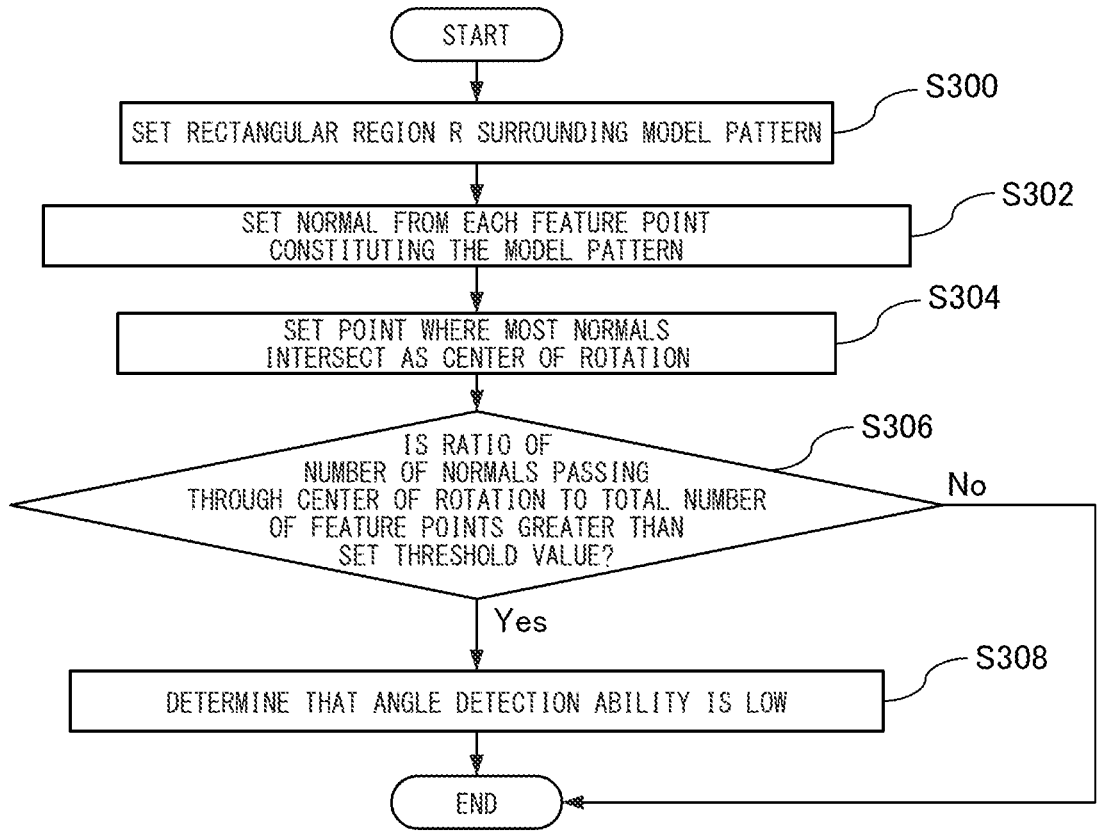
FIG. 10 is a flowchart showing a process in which an angle detection ability evaluation unit 38b evaluates an angle detection ability of a model pattern.

FIG. 10 is a flowchart showing the process (step S106 of FIG. 8) in which the angle detection ability evaluation unit 36*b* evaluates the angle detection ability of the model pattern. First, as shown in FIG. 7, a rectangular region R surrounding the model pattern is set (step S300). Next, the normal is set for the contour of each feature point through each feature point constituting the model pattern (step S302). Next, the point where the most normals intersect is set as the center of rotation (step S304).

Next, it is judged whether or not the ratio of the number of normals which pass through the center of rotation to the total number of feature points is greater than the set threshold value (step S306). Then, if the condition of step S306 is satisfied, the process proceeds to step S308, and it is judged that the angle position detection ability of the model pattern is low. After step S308, the process ends. Note that when the condition of step S306 is not satisfied, the angle detection ability of the model pattern is high, and thus, the process ends without performing the process of step S308.

Next, the process in which the feature extraction unit 38 and the collation unit 39 calculate the degree of coincidence between the features of the model pattern and the features in the target image in which the target object is represented using the model pattern in which the feature of interests is set in the manner described above will be described.

The feature extraction unit 38 extracts a plurality of features of the same type as represented in the model pattern from each of a series of images in a time series obtained by the camera 4. Since the feature extraction unit 38 may execute the same processing for each image, the processing for one image will be described below.

When the feature is a feature point such as a point located on the contour of workpiece 10, for example, the feature extraction unit 38 applies an edge detection filter such as a Sobel filter to each pixel in the image, and extracts pixels having an edge strength of a predetermined value or more as features. Alternatively, the feature extraction unit 38 may extract, as the feature, a pixel representing a corner detected by applying a corner detection filter such as a Harris filter to the image. Alternatively, the feature extraction unit 38 may extract a pixel detected by applying the SIFT algorithm to the image as a feature.

The feature extraction unit 38 notifies the collation unit 39 of the position of each feature extracted from the image for each image. For example, the feature extraction unit 38 generates a binary image in which the pixels representing the extracted feature and the other pixels have different values as data representing the position of each feature, and transmits the binary image to the collation unit 39.

The collation unit 39 detects the workpiece 10 from the image by collating the model patterns and the plurality of features extracted from the image for each of the series of time-series images obtained by the camera 4. Since the collation unit 39 may execute the same processing for each image, the processing for one image will be described below.

For example, the collation unit 39 reads a model pattern from the memory 33 and collates the model pattern with the image of interest to detect the region in which the workpiece 10 is represented in the image. For example, the collation unit 39 sets a plurality of comparison regions collated with the model pattern in the image by changing the relative positional relationship of the model pattern with respect to the image. The relative position relationship can be changed, for example, by changing at least one of the relative position (or angle) of the model pattern with respect to the image, the relative orientation of the model pattern with respect to the image, and the relative size (scale) of the model pattern with respect to the image. Such changes may be performed by, for example, converting the positions and postures of the features constituting the model pattern to the positions and postures seen from the image coordinate system using a homogeneous transformation matrix, as described in Japanese Unexamined Patent Publication (Kokai) No. 2017-91079 and may be performed, for example, by applying an affine transformation to the model pattern. The collation unit 39 calculates an overall degree of coincidence representing the degree of matching between the plurality of features set for the entire model pattern and the plurality of features extracted from the comparison region, for each comparison region and between the comparison region and the model pattern. Further, the collation unit 39 calculates a partial degree of coincidence representing the degree of matching with the features extracted from the image for each comparison region for the feature of interest set in the model pattern.

The collation unit 39 can calculate, for example, the overall degree of coincidence and the partial degree of coincidence in accordance with the following formulas.

Overall degree of coincidence=number of features set for model pattern whose distance to any of features extracted from comparison region of target image is less than or equal to predetermined value/total number of features set for model pattern Partial degree of coincidence=number of features of interest of model pattern whose distance to any of features of target image is less than or equal to predetermined value/total number of features of interest When each feature is represented by a point such as a point on the contour (i.e., when each feature is a feature point), the distance between two features in the above calculation formulas of overall degree of coincidence and partial degree of coincidence can be the Euclidean distance between feature points. Also, when each feature is a straight line or a curve, the distance between the two features can be the average of the Euclidean distances between a plurality of predetermined positions (for example, the ends and the midpoint) of each of the two straight lines or each of the two curves which serve as features.

Alternatively, the collation unit 39 may calculate the overall degree of coincidence and the partial degree of coincidence for each feature of the model pattern in accordance with, for example, the following formulas so that the closer the distance to the nearest feature in the comparison region, the greater the overall degree of coincidence and partial degree of coincidence.

Overall degree of coincidence=$\Sigma n\text{-}1^{N}(1/(dn+1))/N$

Partial degree of coincidence=$\Sigma m\text{-}1^{M}(1/(dm+1))/M$

However, do is the minimum value of the distance from the nth feature set for the model pattern to any of the features extracted from the comparison region of the target image, and N represents the total number of features set for the model pattern. Likewise, dm is the minimum value of the distance from the mth feature of interest of the model pattern to any of the features extracted from the comparison region of the target image, and M represents the total number of features of interest contained in the model pattern.

When the overall degree of coincidence is greater than or equal to the predetermined overall degree of coincidence threshold and the partial degree of coincidence is greater than or equal to the predetermined partial degree of coincidence threshold for the comparative region of interest, the collation unit 39 judges that the workpiece 10 is represented in the comparison region of interest. Since the feature of interest is a feature which is distributed in a direction different from the direction in which the position detection ability is low, when the partial degree of coincidence is greater than or equal to the predetermined partial degree of coincidence threshold, even in the direction in which the position detection ability is low, it is accurately judged that workpiece 10 is represented in the comparison region of interest. Likewise, since the feature of interest is a feature which is distributed in a direction different from the rotation direction in which the angle detection ability is low, when the partial degree of coincidence is greater than or equal to the predetermined partial degree of coincidence threshold, even in the direction where the angle detection ability is low, it is accurately judged that workpiece 10 is represented in the comparison region of interest.

Figure 11A:
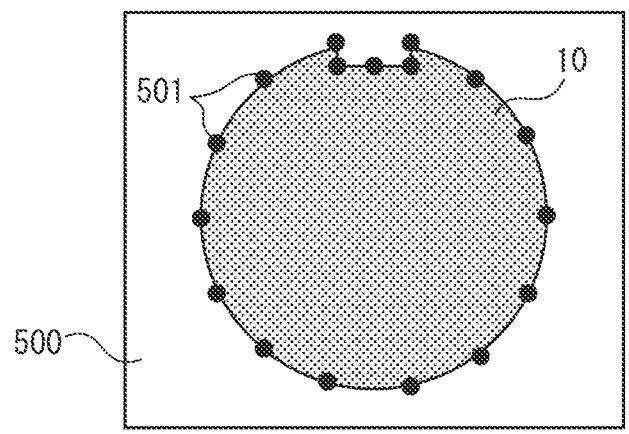
FIG. 11A is an explanatory outline view of collation of a model pattern and an image.
Figure 11B:
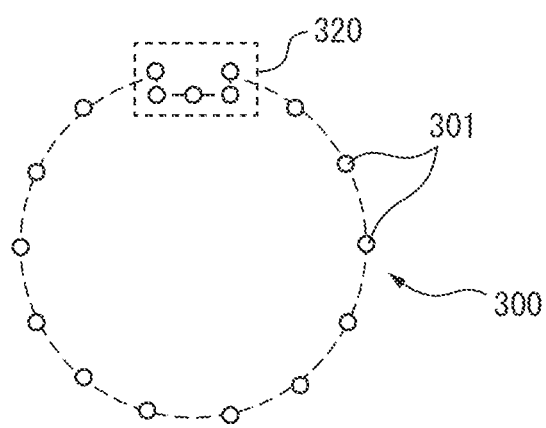
FIG. 11B is an explanatory outline view of collation of a model pattern and an image.

FIGS. 11A to 11E are view for detailing an outline of the collation between the model pattern 300 and the image. The case in which the model pattern 300 shown in FIG. 6 and the image are collated will be described. As shown in FIG. 11A, the workpiece 10 represented in an image 500 has a contour having a substantially circular shape and a part of the contour lacking in a concave shape (key groove 10*b*). A plurality of features 501 are extracted along the contour of the workpiece 10. As shown in FIG. 11B, also in the model pattern 300, a plurality of features 301 are set along the contour of the workpiece 10, and a feature of interest 320 is set in the portion where the contour is lacking in a concave shape.

Figure 11C:
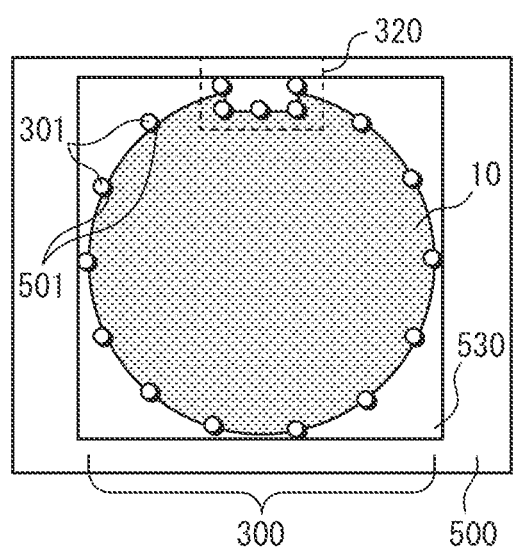
FIG. 11C is an explanatory outline view of collation of a model pattern and an image.

As shown in FIG. 11C, in the image 500, a comparison region 530 is set so as to include the workpiece 10, and the angle of the model pattern 300 and the angle of the workpiece 10 in the image 500 match. In this case, in the entire model pattern 300, the individual feature 301 set for the model pattern and the individual feature 501 extracted from the image 500 substantially match, and the feature of interest 320 and the feature 501 corresponding to the feature of interest 320 extracted from the image 500 substantially match. Thus, both the overall degree of coincidence and the partial degree of coincidence are high values, whereby it is judged that the workpiece 10 is represented in the comparison region 530, and it can be seen that the angle of the workpiece 10 in the image 500 is the same angle as the model pattern 300.

Figure 11D:
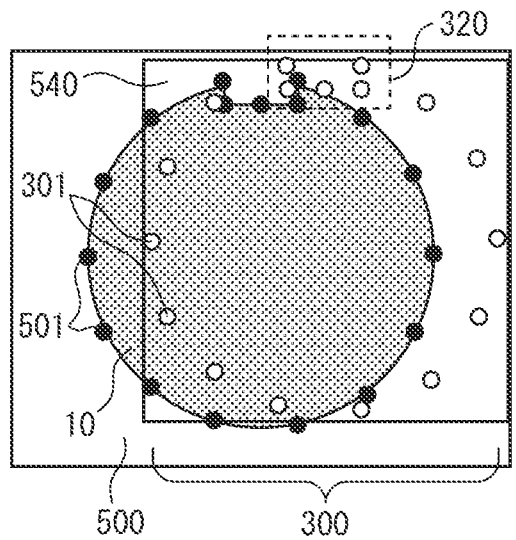
FIG. 11D is an explanatory outline view of collation of a model pattern and an image.

Conversely, when the comparison region 540 is shifted from the region in which the workpiece is represented, as shown in FIG. 11D, the individual feature 301 set for the model pattern 300 and the individual feature 501 extracted from the image 500 do not match for the entire comparison region. Further, the feature of interest 320 does not match the individual feature 501 extracted from image 500. As a result, both the overall degree of coincidence and the partial degree of coincidence are low. Thus, the comparison region 540 is judged to be different from the region in which workpiece 10 is represented.

Figure 11E:
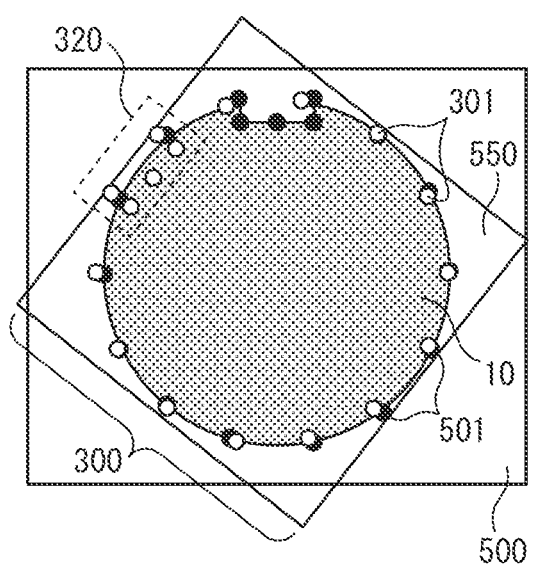
FIG. 11E is an explanatory outline view of collation of a model pattern and an image.

Further, as shown in FIG. 11E, though the comparison region 550 includes the workpiece 10, it is set so that the angle of the workpiece 10 in the image 500 and the angle of the model pattern 300 for collation are different from each other. In this case, since the model pattern 300 is positioned so as to substantially match the contour of the workpiece 10, among the plurality of features 501, many are close to any of the features 301, whereby the overall degree of coincidence is a relatively high value. However, since the position of the concave portion of the workpiece 10 and the position of the feature of interest 320 of the model pattern 300 are different from each other, the partial degree of coincidence is a low value. As a result, the workpiece 10 is not detected from the comparison region 550.

In this manner, the collation unit 39 detects the region in the image in which workpiece 10 is represented based on both the overall degree of coincidence and the partial degree of coincidence calculated from the entire model pattern. Thus, the angle of the workpiece 10 is accurately detected in the rotation direction in which the angle detection ability is low.

Note that though FIGS. 11A to 11E illustrate examples of collating the model pattern 300 shown in FIG. 6 and the image, since the collation unit 39 detects the region in the image in which the workpiece 10 is shown based on both the overall degree of coincidence and the partial degree of coincidence calculated from the entire model pattern, even in the case in which the model pattern 300 shown in FIG. 5 and image are collated, the position of the workpiece 10 can accurately be detected even in the direction in which the position detection ability is low.

Note that the threshold of the overall degree of coincidence and threshold of the partial degree of coincidence may be the same or different from each other, and when there are a plurality of regions with features of interest set in the model pattern, the values of thresholds of the partial degree of coincidence applied for each of the plurality of regions may be different, or alternatively, the values of thresholds of the partial degree of coincidence applied to the plurality of regions may be the same.

A plurality of model patterns may be prepared in advance. In this case, the viewing direction of the workpiece 10 may be different for each model pattern. In this case, the collation unit 39 calculates the overall degree of coincidence and the partial degree of coincidence for each comparison region in the same manner as described above for each of the plurality of model patterns. The collation unit 39 may judge that the workpiece 10 seen from the direction represented by the model pattern appears in the comparison region corresponding to the position of the model pattern for which the sum of the overall degree of coincidence and the partial degree of coincidence is maximized, the overall degree of coincidence is greater than or equal to the threshold of the overall degree of coincidence, and the partial degree of coincidence is greater than or equal to the threshold of the partial degree of coincidence.

When the position of the workpiece 10 in the image is obtained, the collation unit 39 detects the position of the workpiece 10 in the real space based on the position. The position of each pixel in the image corresponds one-to-one with the orientation seen from the camera 4. Thus, the collation unit 39 can, for example, set the direction corresponding to the center of gravity of the region in which the workpiece 10 is represented in the image as the direction from the camera 4 to the workpiece 10. Further, the collation unit 39 can calculate the estimated distance from the camera 4 to the workpiece by multiplying a reference distance by the ratio of the area of the workpiece 10 in the image when the distance from the camera 4 to the workpiece 10 is a predetermined reference distance to the area of the region in which the workpiece 10 is represented in the image. Thus, the collation unit 39 can detect the position of the workpiece 10 in the camera coordinate system based on the position of the camera 4 based on the direction from the camera 4 to the workpiece 10 and the estimated distance.

Further, the collation unit 39 can acquire the actual rotation amount of the workpiece 10 with respect to the direction of the workpiece 10 represented by the model pattern when viewed from a predetermined direction depending on the orientation of the model pattern in the comparison region for which it is judged that the workpiece 10 is represented. Thus, the collation unit 39 can acquire the posture of the workpiece 10 in accordance with the amount of rotation thereof. Further, the collation unit 39 can acquire the posture of the workpiece 10 represented in the camera coordinate system by rotating the posture of the workpiece 10 in the image by the difference between the predetermined direction specified for the model pattern and the orientation from the camera 4 corresponding to the center of gravity of the region in which the workpiece 10 is represented.

The collation unit 39 outputs the position of the workpiece 10 to the movable part control unit 40 each time the position of the workpiece 10 in the real space is acquired.

The movable part control unit 40 controls the movable part of the robot 2 based on the position and posture of the workpiece 10 detected by the collation unit 39. For example, each movable part of the robot 2 is controlled so that the tool 16 of the robot 2 moves to a position where the operation on the workpiece 10 can be performed. At that time, the movable part control unit 40 controls each movable part of the robot 2 so that, for example, in the image generated by the camera 4, the workpiece is shown in a predetermined position and at a predetermined size corresponding to the position where the tool 16 operates on the workpiece 10. In this case, the movable part control unit 40 may control each movable part of the robot 2 according to a method of controlling the robot based on the image of the target object obtained by the camera, for example, a position-based method or a feature-based method. Regarding such methods, refer to, for example, Hashimoto, "Vision and Control," The Society of Instrument and Control Engineers, Control Division Conference Workshop, Kyoto, pp. 37-68, 2001.

Figure 12:
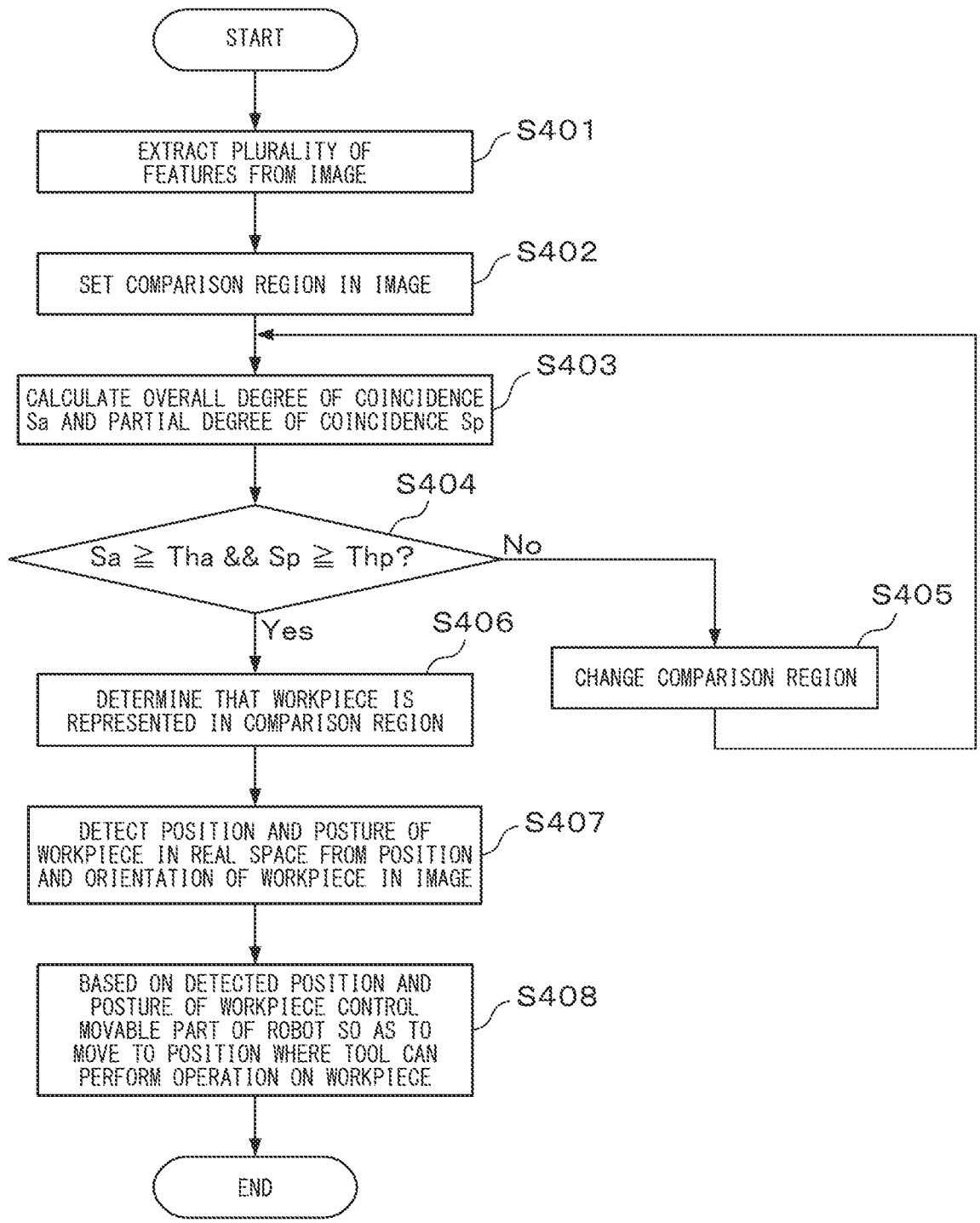
FIG. 12 is an operation flow chart of a moving part control process including an object detection process.

FIG. 12 is an operation flowchart of a moving part control process including the object detection process. The processor 34 executes the moving part control process each time an image is obtained from the camera 4 in accordance with the following operation flowcharts. In the following operation flowchart, the processes of steps S401 to S407 are included in the object detection process.

The feature extraction unit 38 extracts a plurality of features of the appearances of different positions of the workpiece 10 from the image (step S401). The collation unit 39 sets a comparison region in the image for collating with the model pattern (step S402). The collation unit 39 calculates the overall degree of coincidence Sa and the partial degree of coincidence Sp between the model pattern and the comparison region (step S403). The collation unit 39 then judges whether or not the overall degree of coincidence Sa is equal to or greater than the overall degree of coincidence threshold Tha and the partial degree of coincidence Sp is equal to or greater than the partial degree of coincidence threshold Thp (step S404).

When the overall degree of coincidence Sa is less than the overall degree of coincidence threshold Tha, or the partial degree of coincidence Sp is less than the partial degree of coincidence threshold Thp (No in step S404), the collation unit 39 judges that the workpiece 10 is not represented in the comparison region in the same orientation as the model pattern. The collation unit 39 then changes the comparison region by changing at least one of the relative position, orientation, and scale of the model pattern with respect to the image (step S405). Thereafter, the collation unit 39 repeats the processes after step S103.

Conversely, when the overall degree of coincidence Sa is equal to or greater than the overall degree of coincidence threshold Tha, and the partial degree of coincidence Sp is greater than or equal to the partial degree of coincidence threshold Thp (Yes in step S404), the collation unit 39 judges that a workpiece 10 having the same orientation as that of the collated model pattern is represented in the comparison region (step S406). The collation unit 39 then detects the position and posture of the workpiece 10 in the real space from the position and orientation of the workpiece 10 in the image (step S407).

The movable part control unit 40 controls the movable part of the robot 2 so that the tool 16 moves to the position where the operation on the workpiece 10 can be performed based on the position and the posture of the workpiece 10 in the real space (step S408).

After step S408, the processor 34 ends the moving part control process. When the collation unit 39 does not detect the workpiece 10 in the image even after the processes of steps S403 to S405 have been repeated a predetermined number of times or more, the collation unit 39 may judge that the workpiece 10 is not represented in the image. In this case, the movable part control unit 40 may stop the movable part.

Next, as a method for calculating the degree of coincidence between the model pattern 300 for which a feature of interest has been set and the target image, a method in which the degree of coincidence is calculated by weighting the feature of interest of the model pattern 300 higher than the weight of features other than the feature of interest. In this case, the collation unit 39 calculates the degree of coincidence in accordance with the following formula (5).

[Math 6]

$$\text{Degree of Coincidence} = \frac{\sum_{j=1}^{N} W_j \times \delta_i}{\sum_{i=1}^{N} W_i} \tag{5}$$

In formula (5), N is the total number of feature points on the model pattern. Furthermore, assuming that the distance between the feature point Pj on the model pattern 300 and the feature point Qj corresponding to Pj in the target image is |Pj−Qj|, δj is defined as follows.

[Math 7]

$$\delta_j = \begin{cases} 1 & (|P_j - Q_j| < D) \\ 0 & (|P_j - Q_j| \geq D) \end{cases}$$

In formula (5), W is a weighting factor. As an example, when the feature point Pj on the model pattern 300 is the feature of interest, W=1.2, and when the feature point Pj on the model pattern 300 is not the feature of interest, W=0.8.

When the distance |Pj−Qj| between an arbitrary feature point Pj on the model pattern 300 and the feature point Qj in the target image corresponding to the feature point Pj is less than a predetermined value D, based on the formula (5), the collation unit 39 judges that the feature point Pj and the feature point Qj match, and calculates the degree of coincidence using the value of the weighting coefficient Wj (δj=1). Conversely, when the distance |Pj−Qj| is equal to or greater than the predetermined value D, the collation unit 39 judges that the feature point Pj and the feature point Qj do not match, and calculates the degree of coincidence without using the value of the weighting coefficient Wj (δj=0).

In formula (5), the weighting coefficient Wj when the feature point Pj on the model pattern 300 is the feature of interest is set to a value greater than the weighting coefficient Wj when the feature point Pj is a feature other than the feature of interest. Thus, the better the feature of interest set on the model pattern 300 matches the feature in the target image, the higher the degree of coincidence calculated from formula (5), and in the calculation of degree of coincidence, the contribution of the feature of interest having the position detection ability or the angle detection ability is higher than the contribution of features other than the feature of interest. Therefore, even when the model pattern 300 does not have position detection ability or angle detection ability, by focusing on the degree of coincidence in the feature of interest, the degree of coincidence between the model pattern 300 and the target object represented by the target image can be calculated with high accuracy.

Figure 13:
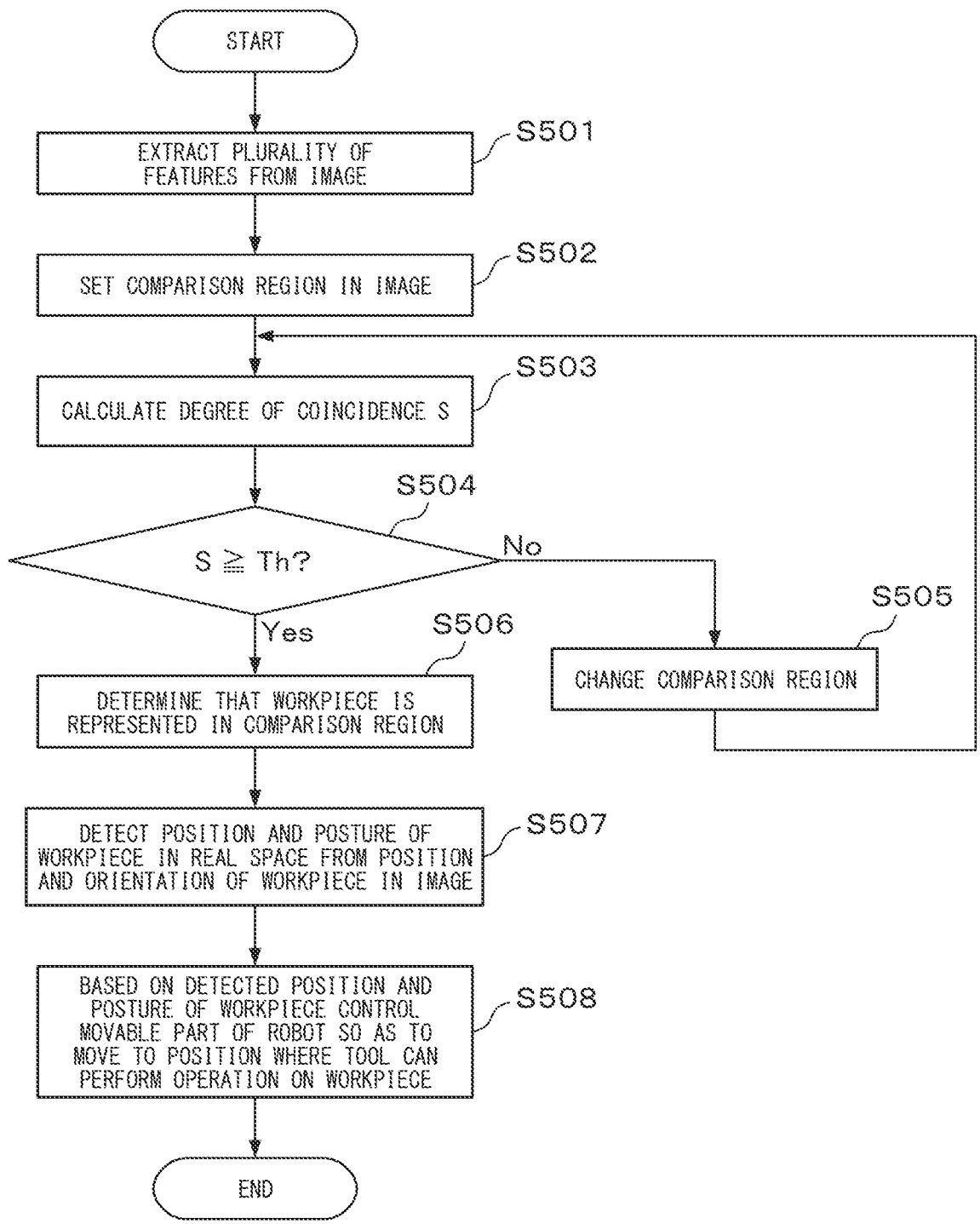
FIG. 13 is an operation flowchart of a moving part control process including an object detection process, showing a process of the case in which a degree of coincidence is calculated by weighting a feature of interest of a model pattern more highly than features other than the feature of interest.

FIG. 13 is an operation flowchart of the moving part control process, and shows the processing in the case where the weight of the feature of interest on the model pattern 300 is higher than the weight of features other than the feature of interest and the degree of coincidence is calculated. The processor 34 executes the moving part control process each time an image is obtained from the camera 4 in accordance with the following operation flowchart. In the following operation flowchart, the processes of steps S501 to S507 are included in the object detection process.

The feature extraction unit 38 extracts a plurality of features of the appearances of different positions of the workpiece 10 from the image (step S501). The collation unit 39 sets a comparison region in the image for collation with the model pattern (step S502). The collation unit 39 calculates the degree of coincidence S between the model pattern and the comparison region (step S503). At this time, the collation unit 39 weights the weighting coefficient Wj when the feature point Pj on the model pattern 300 is the feature of interest higher than the weighting coefficient Wj when the feature point Pj is a feature other than the feature of interest, based on formula (5), and calculates the degree of coincidence S. The collation unit 39 then judges whether or not the degree of coincidence S is equal to or higher than a threshold value Th (step S504).

When the degree of coincidence S is less than the threshold value Th (No in step S504), the collation unit 39 judges that the workpiece 10 corresponding to the model pattern 300 is not represented in the comparison region. The collation unit 39 then changes the comparison region by changing at least one of the relative position, orientation, and scale of the model pattern 300 with respect to the image (step S505). Thereafter, the collation unit 39 repeats the processes after step S503.

Conversely, when the degree of coincidence S is equal to or greater than the threshold value Th (Yes in step S504), the collation unit 39 judges that the workpiece 10 corresponding to the collated model pattern 300 is represented in the comparison region (step S506). The processing after step S506 is performed in the same manner as the processing after step S406 in FIG. 11.

As described above, the model pattern evaluation device calculates the evaluation value representing the geometric distribution of a plurality of features included in the model pattern, and based on the evaluation value, specifies the direction in which the distribution spread of feature positions is maximized as the specific direction in which the position detection ability is low. Furthermore, the model pattern evaluation device specifies that at least some of the plurality of features are distributed along a rotation direction centered on a predetermined point based on the evaluation value, and defines this rotation direction as the direction in which the angle detection ability is low. A feature distributed in the direction different from this specific direction or rotation direction is set on the model pattern as the feature of interest. The object detection device collates the model pattern with the target image, and based on the degree of coincidence between the feature of interest and the features extracted from the image, judges whether the position or angle of the model pattern matches the target object represented in the target image. Thus, this object detection device can suppress false detection of other objects as the target object even if other objects having an overall shape similar to the entirety of the target object are represented in the image, and can accurately detect the target object represented in the image. In particular, this object detection device can accurately detect the target object from the image even if the target object has, for example, a simple linear shape or a symmetric shape.

Modification Example

This object detection device may be used for purposes other than controlling an automated machine. For example, this object detection device may be used to judge the quality of the workpiece conveyed on the belt conveyor. In this case, the camera 4 may be fixedly attached, for example, so that a part of the transport path of the workpiece 10 is included in the photographing range of the camera 4. The object detection device can be, for example, a device having the same configuration as the controller 3 shown in FIG. 2. However, the drive circuit 32 may be omitted. In this case, a model pattern representing a non-defective product of the workpiece 10 is stored in the memory of the object detection device. In this case, the processor of the object detection device may execute the processing of the feature extraction unit 38 and the processing of the collation unit 39 on the image obtained by the camera 4. When the collation unit 39 detects the workpiece 10 from the image obtained by the camera 4 by collation with the model pattern, it may judge that the workpiece 10 is a satisfactory product. Conversely, when the collation unit 39 cannot detect the workpiece 10 from the image, the workpiece 10 located within the shooting range of the camera 4 when the image is generated may be judged as a defective product. The processor of the object detection device may display a pass/fail judgment result on the display device, or alternatively, the pass/fail judgment result may be notified to other devices connected via the communication interface.

According to this modification example, the object detection device can judge the quality of an inspection target even if the position and posture of the inspection target are not specified.

The computer program for executing the processing of each part of the processor 34 of the controller 3 may be provided in a form recorded on a computer-readable portable recording medium such as a semiconductor memory, a magnetic recording medium, or an optical recording medium.

Furthermore, though FIG. 4 shows an example in which the model pattern evaluation device and object detection device are constituted by a single processor 34 of the controller 3 included in the robot system 1, the model pattern evaluation device and object detection device may be separately configured.

For example, when the shape of the model pattern is predetermined, etc., using a model pattern evaluation device configured separately from the object detection device, the position detection ability and angle detection ability of the model pattern may be evaluated in advance, and the region of interest may be set in advance on the model pattern. In this case, the feature of interest is preset in the model pattern by the model pattern evaluation device configured separately from the controller 3. The model pattern in which the feature of interest is set is stored in the memory 33 of the controller 3 included in the robot system 1.

Conversely, for example, a model pattern 300 may be created sequentially each time an image of the target object photographed by the camera 4 is acquired, the position detection ability and angle detection ability of the created model pattern may be evaluated, the feature of interest may be set, and target objects may be sequentially detected using that model pattern. In such a case, it is preferable that a single processor 34 comprise the constituent elements of the model pattern evaluation process composed of the evaluation unit 36 and the feature of interest setting unit 37 as shown in FIG. 4, and the constituent elements of the object detection process consisting of feature extraction unit 38 and collation unit 39.

All examples and specific terms given herein are intended for teaching purposes to help the reader understand the invention and the concepts contributed by the inventors to the promotion of the art, and it should be understood that the present invention is not limited to the features of any example herein, such particular examples and conditions described, with respect to demonstrating the superiority and inferiority of the invention. Though the embodiments of the present invention have been described in detail, it should be appreciated that various changes, substitutions, and modifications can be made without departing from the spirit and scope of the invention.

REFERENCE SIGNS LIST 1 robot system
2 robot
3 controller
4 camera
5 communication line
6 object detection device
11 pedestal
12 rotating stage
13 first arm
14 second arm
15 wrist
16 tool
21 to 25 joint
31 communication interface
32 drive circuit
33 memory
34 processor
35 servo motor
36 evaluation unit
36a position detection ability evaluation unit
36b angle detection ability evaluation unit
37 feature of interest setting unit
38 feature extraction unit
39 collation unit
40 movable part control unit

The invention claimed is:

1. A model pattern evaluation device for a robotic system, comprising:
a processor configured to:
receive an image in which a target object is represented captured by a camera attached to a movable robotic component of the robotic system;
calculate, for detecting the target object from the image, an evaluation value representing a geometric distribution of a plurality of features in a model pattern, said model pattern corresponding to the target object;
set, among the plurality of features, a first feature for detecting a position in a specific direction of the target object in the image or a second feature detecting an angle in a rotational direction centered about a predetermined point of the target object in the image as a feature of interest based on the evaluation value; and
generate a detection result based on the first feature or the second feature to control the movable robotic component of the robotic system.

2. The model pattern evaluation device according to claim 1, wherein the processor is configured to:
specify a direction in which a spread of a distribution of positions of the features is maximized as the specific direction based on the evaluation value; and
set, among the plurality of features, a feature which is distributed in a direction different from the specific direction as the first feature.

3. The model pattern evaluation device according to claim 1, wherein the processor is configured to acquire a normal vector relative to the direction in which adjacent features are aligned for each of the plurality of features, calculates a covariance matrix representing the distribution of the normal vector as the evaluation value, and when the ratio of the smaller eigenvalue to the larger eigenvalue of the two eigenvalues of the covariance matrix is equal to or less than a first threshold value, sets a direction of the eigenvector corresponding to the larger eigenvalue as the specific direction.

4. The model pattern evaluation device according to claim 1, wherein the processor is configured to:
specify that a part of the features is distributed along the rotation direction centered about the predetermined point based on the evaluation value, and
set a feature distributed in a direction different from the rotational direction as the feature of interest.

5. The model pattern evaluation device according to claim 4, wherein the processor is configured to acquire a normal relative to a direction in which adjacent features are aligned for each of the plurality of features, at least a part of the normals intersecting at the predetermined point, set the ratio of the number of normals which do not intersect at the predetermined point to the total number of the features as the evaluation value, and specify that the part of the features is distributed along the rotation direction centered about the predetermined point when the ratio is equal to or greater than a second threshold value.

6. The model pattern evaluation device according to claim 5, wherein the processor is configured to set a feature for which the normal does not intersect at the predetermined point as the feature of interest.

* * * * *

UNITED STATES PATENT AND TRADEMARK OFFICE
CERTIFICATE OF CORRECTION

| | | |
|---|---|---|
| PATENT NO. | : 12,361,582 B2 | Page 1 of 1 |
| APPLICATION NO. | : 17/787668 | |
| DATED | : July 15, 2025 | |
| INVENTOR(S) | : Shoutarou Ogura and Fumikazu Warashina | |

It is certified that error appears in the above-identified patent and that said Letters Patent is hereby corrected as shown below:

In the Claims

In Column 24, Line 35 in Claim 1, the phrase "feature detecting" should read -- feature for detecting --.

Signed and Sealed this
Twenty-fifth Day of November, 2025

John A. Squires
*Director of the United States Patent and Trademark Office*